(12) United States Patent
Iwasaki et al.

(10) Patent No.: US 6,909,686 B2
(45) Date of Patent: Jun. 21, 2005

(54) ABERRATION CORRECTING OPTICAL UNIT, OPTICAL PICKUP APPARATUS AND INFORMATION RECORDING/ REPRODUCING APPARATUS WITH SINGLE AND MULTI-LAYER ELECTRODES

(75) Inventors: Masayuki Iwasaki, Tsurugashima (JP); Masakazu Ogasawara, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 233 days.

(21) Appl. No.: 09/739,452

(22) Filed: Dec. 19, 2000

(65) Prior Publication Data

US 2001/0028028 A1 Oct. 11, 2001

(30) Foreign Application Priority Data

Dec. 20, 1999 (JP) .......................................... 11-361217
Mar. 7, 2000 (JP) ........................................ 2000-61451

(51) Int. Cl.⁷ ................................................. G11B 7/00
(52) U.S. Cl. .................... 369/112.02; 349/156; 349/187
(58) Field of Search ..................... 369/112.02; 349/155, 349/156, 187

(56) References Cited

U.S. PATENT DOCUMENTS

| | | | | | |
|---|---|---|---|---|---|
| 4,443,062 | A | * | 4/1984 | Togashi et al. ............... | 349/83 |
| 5,018,838 | A | * | 5/1991 | Barnes et al. ................ | 350/347 |
| 5,583,678 | A | * | 12/1996 | Nishino et al. .............. | 349/118 |
| 5,648,859 | A | * | 7/1997 | Hirabayashi et al. .......... | 349/9 |
| 5,936,923 | A | * | 8/1999 | Ootaki et al. ............. | 369/53.19 |
| 6,125,088 | A | * | 9/2000 | Ogasawara ............... | 369/44.32 |
| 6,198,465 | B1 | * | 3/2001 | Furukawa et al. ............. | 345/94 |
| 6,226,067 | B1 | * | 5/2001 | Nishiguchi et al. ......... | 349/155 |
| 6,233,034 | B1 | * | 5/2001 | Lee et al. .................... | 349/141 |
| 6,246,648 | B1 | * | 6/2001 | Kuribayashi ............. | 369/44.32 |
| 6,256,082 | B1 | * | 7/2001 | Suzuki et al. ............... | 349/144 |
| 6,310,668 | B1 | * | 10/2001 | Ukita .......................... | 349/42 |
| 6,480,454 | B1 | * | 11/2002 | Wada et al. ........... | 369/112.02 |
| 6,512,556 | B1 | * | 1/2003 | Sekiguchi .................... | 349/49 |
| 6,532,202 | B1 | * | 3/2003 | Wada et al. ........... | 369/112.02 |

* cited by examiner

*Primary Examiner*—Gautam R. Patel
(74) *Attorney, Agent, or Firm*—Sughrue Mion, PLLC

(57) ABSTRACT

An aberration correcting optical unit includes an optical element for causing a phase change to light passing therethrough by the application of voltage and electrode layers for applying voltages to the optical element. The optical element is sandwiched between the electrode layers. At least one of the electrode layers includes a plurality of electrodes which are electrically isolated from one another. The plurality of electrodes are disposed such that an electric field generated in a portion of the optical element corresponding to a portion between the plurality of electrodes is larger than a predetermined intensity when a predetermined voltage is applied to the optical element.

8 Claims, 19 Drawing Sheets

ABERRATION CORRECTING OPTICAL UNIT, OPTICAL PICKUP APPARATUS AND INFORMATION RECORDING/REPRODUCING APPARATUS WITH SINGLE AND MULTI-LAYER ELECTRODES

BACKGROUND OF THE INVENTION

1. Field of the Invention

The present invention relates to an aberration correcting optical unit for correcting aberration when information is recorded on or reproduced from an information recording medium such as an optical disc as well as an optical pickup apparatus having the aberration correcting optical unit and an information recording and/or reproducing apparatus (hereinafter, referred to as "an information recording/reproducing apparatus").

2. Description of the Related Art

Optical discs such as a CD (Compact Disc) and a DVD (Digital Video Disc or Digital Versatile Disc) are known as information recording media for optical information recording or reproduction. In addition, a variety of different optical discs are now under development, such as an optical disc specialized for reproduction, a write-once optical disc capable of additionally recording information thereon, a rewritable optical disc capable of erasing information therefrom and re-recording information thereon, and so on.

Research and development is being pursued relating to high recording density optical discs and an optical pickup apparatus for the high-density discs. In addition, research and development are now under progress for a compatible pickup apparatus and information recording/reproducing apparatus which are applicable to different types of optical discs.

It is contemplated that the numerical aperture (NA) of an objective lens provided in an optical pickup apparatus is increased to irradiate an optical disc with a light beam of a smaller irradiation diameter for supporting the higher density trend of the optical disc. It is also contemplated that a short wavelength light beam is used to support the higher density trend.

An increased numerical aperture of an objective lens and the use of a short wavelength light beam, however, result in larger aberration of the light beam by the optical disc, causing difficulties in improving the accuracy of information recording and information reproduction.

For example, an incident angle range of the light beam to the optical disc becomes larger as the numerical aperture NA of an objective lens is increased, thereby resulting in a larger distribution width of the birefringence amount on the optical disc pupil plane, which is an amount depending on the incident angle. This causes a problem of a larger influence of spherical aberration resulting from the birefringence. Also, when a light beam of a short wavelength is used with an increased numerical aperture NA of an objective lens, influence of coma aberration cannot be negligible if the optical disc is inclined during recording or reproducing information so as to incline an incident angle (tilt angle) of the light beam with respect to the normal direction of the optical disc.

Further, the influence of aberration such as the above-described spherical aberration and coma aberration differs depending on the type of a particular optical disc since different types of optical discs such as CD and DVD have different structures and recording densities, thereby making it difficult to develop compatible optical pickup apparatus and information recording/reproducing apparatus.

Conventionally, an optical pickup apparatus having a liquid crystal unit for correcting aberration has been proposed for reducing the influence of the aberration as mentioned above (Laid-open Japanese Patent Application Kokai No. H10-20263).

This liquid crystal unit has a structure in which a liquid crystal element C is sandwiched between mutually opposing transparent electrodes A, B, as schematically illustrated in FIG. 1. A voltage applied between the transparent electrodes A, B is adjusted to change the alignment state of the liquid crystal element C, such that when light incident on one of the transparent electrode A (or B) passes through the liquid crystal element C, a change in birefringence is given to the light in accordance with the alignment state to emit the light to the other transparent electrode B (or A).

Further, at least one of the transparent electrodes A, B is divided into a plurality of transparent electrodes, for example, a1, a2, a3 and b1, b2, b3. Also, the transparent electrodes a1, a2, a3 are electrically isolated from one another, while the transparent electrodes b1, b2, b3 are also electrically isolated from one another.

Therefore, the liquid crystal element C can be adjusted in a plurality of different alignment states when different voltages are applied between transparent electrodes in an opposing relationship, for example, between the transparent electrodes a1, b1; between the transparent electrodes a2, b2; and between the transparent electrodes a3, b3, so that changes in birefringence in accordance with the respective alignment states can be simultaneously given to light incident thereon.

Then, the liquid crystal unit is positioned on an optical path between a light source for emitting laser light and an objective lens. The liquid crystal unit gives changes in birefringence in accordance with the plurality of alignment states to the laser light, causing the laser light to transmit therethrough to the objective lens. The objective lens converges the transmitted laser light to generate a light beam which is irradiated to an optical disc. Also, when reflected light produced by irradiating the optical disc with the light beam impinges on the liquid crystal unit through the objective lens, the reflected light is given the changes in birefringence in accordance with the plurality of alignment states, causing the reflected light to transmit, and the transmitted reflected light is detected by a photodetector. Therefore, the plurality of alignment states of the liquid crystal unit are adjusted as appropriate to reduce the influence of aberration such as spherical aberration and coma aberration.

However, gaps (SP) are provided between the respective transparent electrodes in the conventional liquid crystal unit to electrically isolate the plurality of transparent electrodes a1, a2, a3 and b1, b2, b3, as illustrated in FIG. 1. More specifically, the gaps SP are provided along the respective boundaries of the transparent electrodes a1, a2, a3, and the gaps SP are provided along the respective boundaries of the transparent electrodes b1, b2, b3.

Therefore, no voltage is applied to the gaps SP, so that the foregoing structure suffers from an inability of controlling the alignment states in the liquid crystal element C corresponding to the gaps SP. As a result, the aberration correction can be made for a light beam or reflected light passing through the transparent electrodes a1, a2, a3 and b1, b2, b3, whereas no aberration correction can be made for a light beam or reflected light passing through the gaps SP, so that a highly accurate aberration correction cannot be carried out for the light beam or the reflected light.

Also, when the transparent electrodes are divided by a larger number with the intention of making a finer correction for the influence of aberration, a large number of transparent electrodes are formed with required electrical insulating features therebetween within a limited effective optical path range in which the laser light or reflected light passes, resulting in an increased number of the gaps SP and a larger area occupied thereby. As a result, a fine aberration correction becomes difficult.

Further, different voltages applied to mutually adjoining transparent electrodes result in abrupt discontinuous alignment states produced in the liquid crystal element C corresponding to the gaps SP intervening between the transparent electrodes.

OBJECT AND SUMMARY OF THE INVENTION

The present invention has been made to overcome the problems of the prior art as mentioned above. It is, therefore, an object of the present invention to provide an aberration correcting optical unit capable of accurately correcting the influence of aberration due to an information recording medium, as well as an optical pickup apparatus including the aberration correcting optical unit, and an information recording/reproducing apparatus including the optical pickup apparatus.

It is another object of the present invention to provide an aberration correcting optical unit capable of accurately correcting the influence of aberration associated with the higher density trend of the information recording media, as well as an optical pickup apparatus including the aberration correcting optical unit, and an information recording/reproducing apparatus including the pickup apparatus.

According to the present invention, there is provided an aberration correcting optical unit disposed in an optical path of an optical system for irradiating a recording medium with a light beam emitted from a light source and for guiding a reflected light beam reflected by the recording medium, for correcting aberration occurring in the optical path, which comprises an optical element for causing a phase change to light passing therethrough by the application of voltage; and electrode layers for applying voltages to the optical element, the electrode layers sandwiching the optical element, wherein at least one of the electrode layers includes a plurality of electrodes electrically isolated from one another, and the plurality of electrodes are disposed such that an electric field generated in a portion of the optical element corresponding to a portion between the plurality of electrodes is larger than a predetermined intensity when a predetermined voltage is applied to the optical element.

According to the present invention, there is provided an aberration correcting optical unit disposed in an optical path between a light source and an optical element for irradiating an information recording medium with a light beam emitted from the light source, in alignment with an optical axis, for correcting aberration of light caused by the information recording medium, which comprises a liquid crystal element exhibiting a predetermined alignment state by applying a predetermined voltage; and mutually opposing electrodes for applying voltages to the liquid crystal element, wherein at least one of the mutually opposing electrodes is formed with a plurality of electrodes of a multi-layer structure arranged in the direction of the optical axis.

According to another aspect of the present invention, the plurality of electrodes formed in a multi-layer structure is formed such that the plurality of electrodes are arranged in the direction of the optical axis without overlapping one another.

According to another aspect of the present invention, the plurality of electrodes formed in a multi-layer structure is formed such that the plurality of electrodes partially overlap one another, and are arranged in the direction of the optical axis.

According to another aspect of the present invention, the electrodes are applied with voltages which produce an electro-optical effect opposite to aberration characteristics caused by an information recording medium.

According to the aberration correcting optical unit of the present invention having the foregoing structure, an electro-optical effect of characteristics opposite to aberration characteristics caused by the information recording medium can be produced in the liquid crystal element by adjusting the voltages applied across mutually opposing voltages, and aberration of light transmitting the liquid crystal element can be corrected by this electro-optical effect. Further, when at least one of the mutually opposing electrodes is formed of a plurality of electrodes in a multi-layer structure, the plurality of electrodes can be oriented toward the liquid crystal element without gaps. For this reason, as the plurality of electrodes are applied with voltages, the electro-optical effect can be produced in the liquid crystal element without gaps, thereby making it possible to correct the aberration without omission. It is also possible to finely correct the aberration.

According to the present invention, there is provided an aberration correcting optical unit disposed in an optical path between a light source and an optical element for irradiating an information recording medium with a light beam emitted from the light source, in alignment with an optical axis, for correcting aberration of light caused by the information recording medium, which comprises a liquid crystal element exhibiting a predetermined alignment state by applying a predetermined voltage; and mutually opposing electrodes for applying voltages to the liquid crystal element, wherein at least one of the mutually opposing electrodes is formed with a plurality of electrodes of a multi-layer structure arranged in the direction of the optical axis.

According to the configuration as described, information can be accurately reproduced based on the reflected light which has been corrected for the influence of aberration.

An information reproducing apparatus according to the present invention comprises the above-mentioned pickup apparatus, and reproduces information by emitting information recording light, and detecting reflected light from an information recording medium. According to this configuration, information can be accurately reproduced based on the reflected light which has been corrected for the influence of aberration.

An information recording apparatus according to the present invention comprises the above-mentioned pickup apparatus, and records information on an information recording medium by emitting information recording light. According to the configuration, information can be accurately reproduced based on reflected light reflected from the information recording medium and corrected for the influence of aberration.

According to the present invention, there is provided an aberration correcting optical unit disposed in an optical path of an optical system for irradiating a recording medium with a light beam emitted from a light source and for guiding a reflected light beam reflected by the recording medium, for correcting aberration occurring in the optical path, which comprises a liquid crystal element for causing a phase change to light passing therethrough by the application of voltage; mutually opposing electrode layers for applying the liquid crystal element with voltages; and an insulating layer disposed between the liquid crystal element and at least one of the electrode layers, wherein the at least one of the electrode layer includes a plurality of divided electrodes electrically isolated from one another by gaps in the same plane, and the insulating layer is of a thickness such that an electric field generated in a portion of the optical element corresponding to the gap between the plurality of divided electrodes is larger than a predetermined intensity when a predetermined voltage is applied to the optical element.

According to the present invention, there is provided an optical pickup apparatus including the aberration correcting optical unit mentioned above, which comprises a light source for emitting a light beam; an optical system for irradiating a recording medium with the light beam emitted from the light source and for guiding a reflected light beam reflected by the recording medium; and a photodetector for detecting the reflected light beam.

DETAILED DESCRIPTION OF THE PREFERRED EMBODIMENTS

Figure 1:
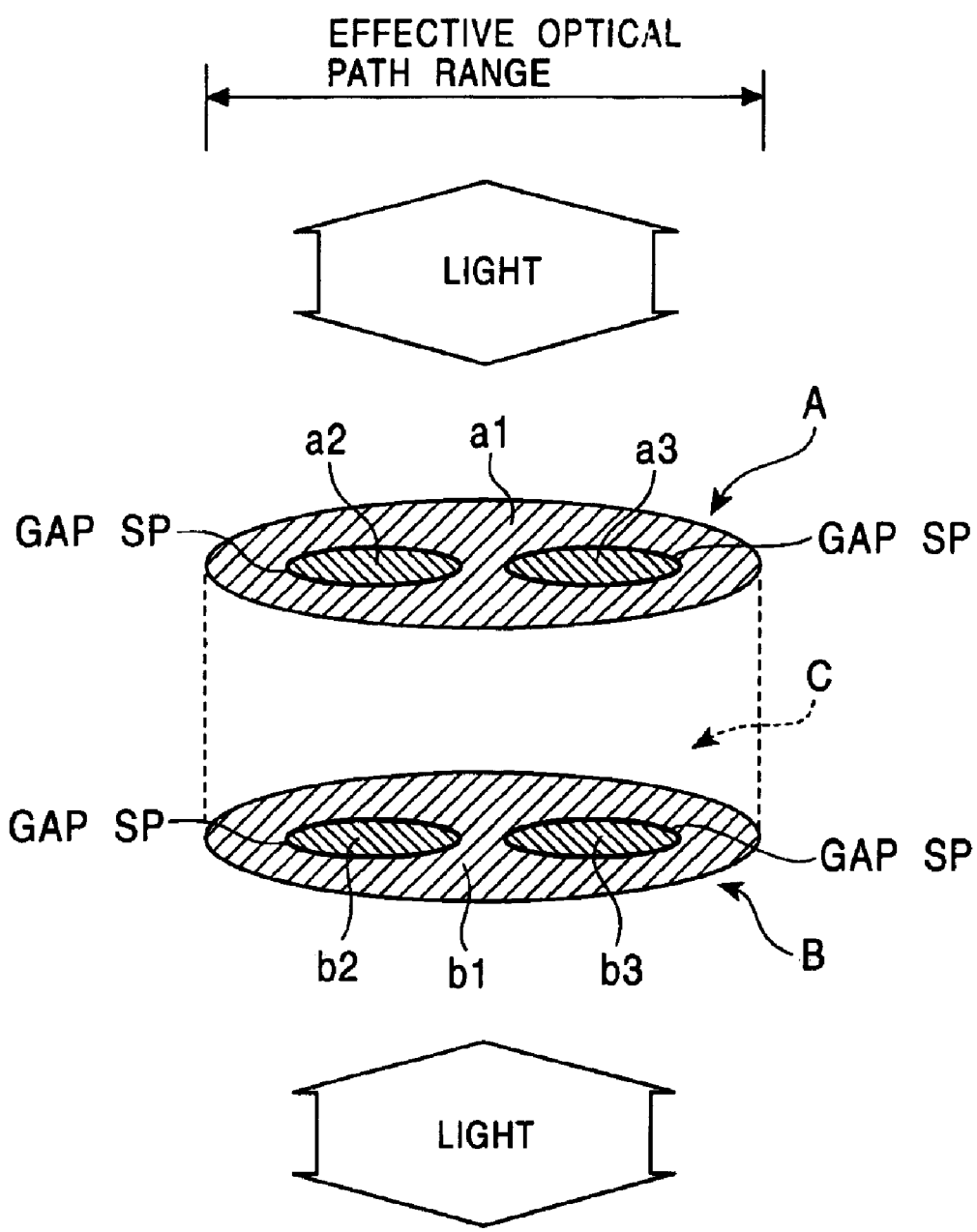
FIG. 1 is a diagram schematically illustrating a conventional liquid crystal unit.
Figure 2:
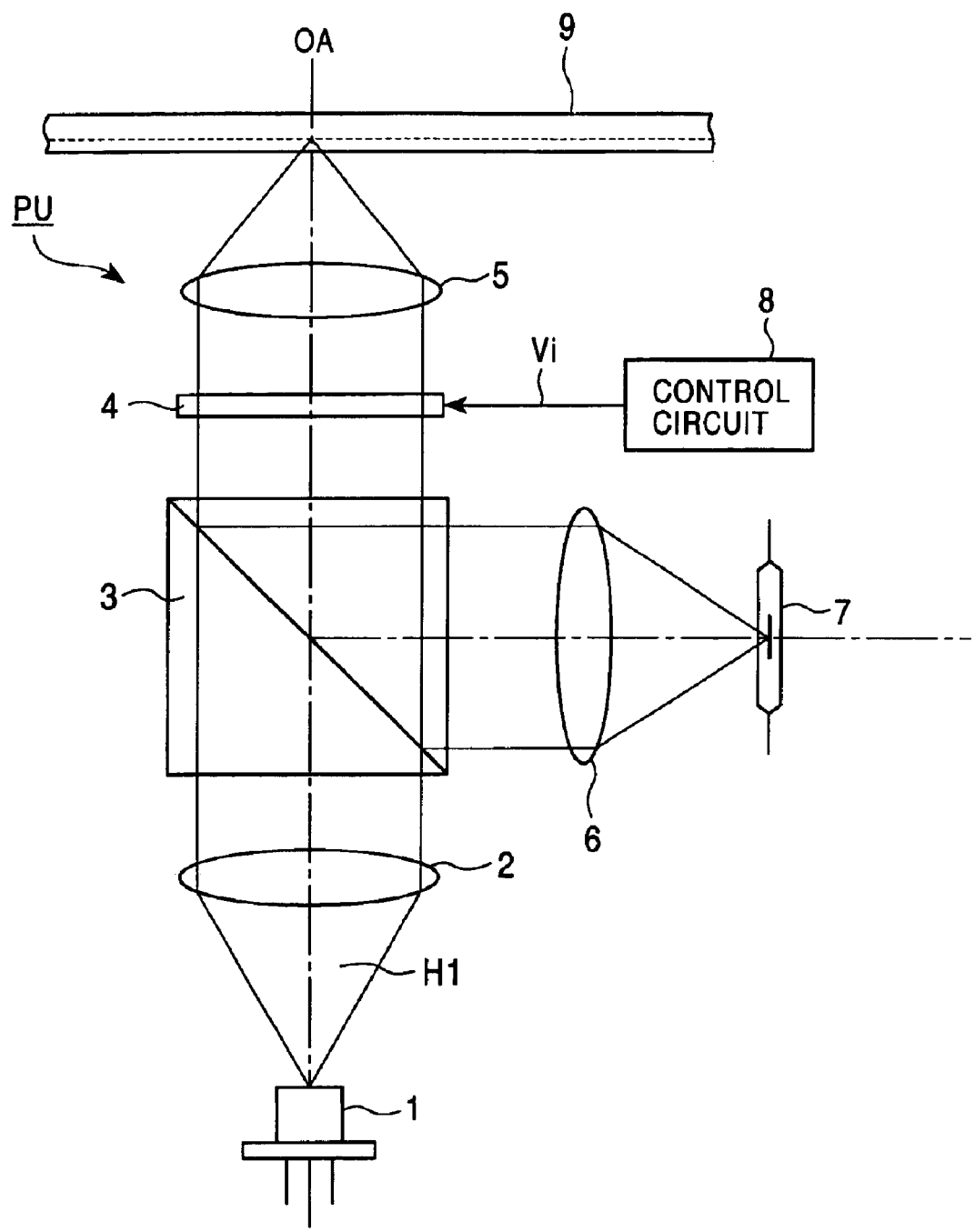
FIG. 2 is a diagram illustrating the configuration of an optical pickup apparatus provided in an information recording/reproducing apparatus according to an embodiment of the present invention.

Embodiments of the present invention will hereinafter be described with reference to the accompanying drawings. FIG. 2 is a diagram illustrating the configuration of an optical pickup apparatus provided in an information recording/reproducing apparatus.

In FIG. 2, the optical pickup apparatus PU includes a light source 1 for emitting laser light H1, a polarizing beam splitter 3, an aberration correcting optical unit 4, an objective lens 5, a converging lens 6 and a photodetector 7. The components 1–7 are arranged along an optical axis OA. A control circuit 8 is provided in the optical pickup apparatus PU or in an information recording/reproducing apparatus for controlling the aberration correcting optical unit 4.

The aberration correcting optical unit 4 has an electro-optic element which exhibits an electro-optic effect that varies depending on an electric field applied thereto. More specifically, the aberration correcting optical unit 4 has a liquid crystal optical element. Birefringence characteristics of the liquid crystal optical element changes in response to a control voltage Vi applied thereto by the control circuit 8.

Figure 3:
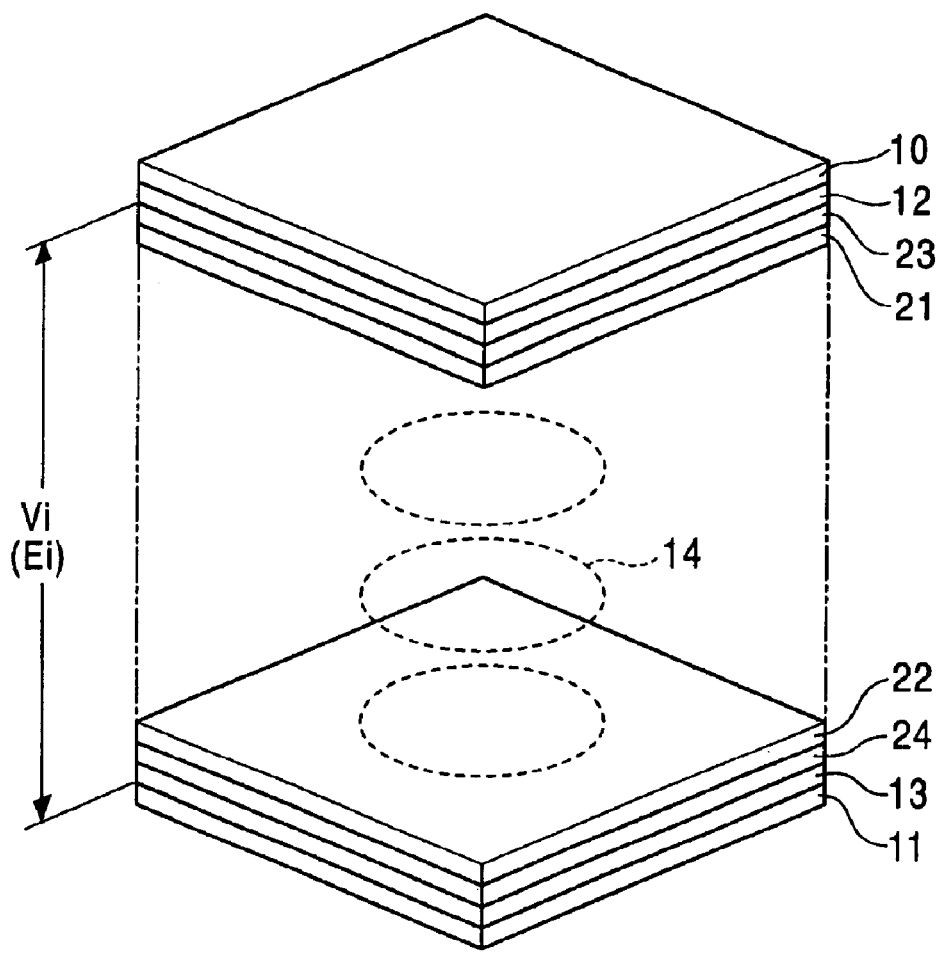
FIG. 3 is a diagram illustrating the operational principle of an aberration correcting optical unit provided in the optical pickup apparatus.

In particular, the aberration correcting optical unit 4 has a structure, as schematically illustrated in FIG. 3, in which a liquid crystal element 14 is encapsulated between two transparent insulating substrates 10, 11 such as glass substrates. Formed between the opposing surfaces of the glass substrates 10, 11 are electrodes 12, 13; insulating films 23, 24; and liquid crystal alignment films 21, 22.

The alignment state of the liquid crystal element 14 changes when a control voltage Vi is applied between the electrodes 12, 13, in response to an electric field Ei produced by the control voltage Vi. As a result, light passing through the liquid crystal element 14 receives birefringence of the liquid crystal element 14 to change in a polarizing state (phase). The polarizing state (phase) can be controlled by the control voltage Vi applied to the liquid crystal element 14.

The aberration correcting optical unit 4 also has bidirectional light transmissivity, so that any side of the insulating substrates 10, 11 may be oriented to the objective lens 5.

Figure 4:
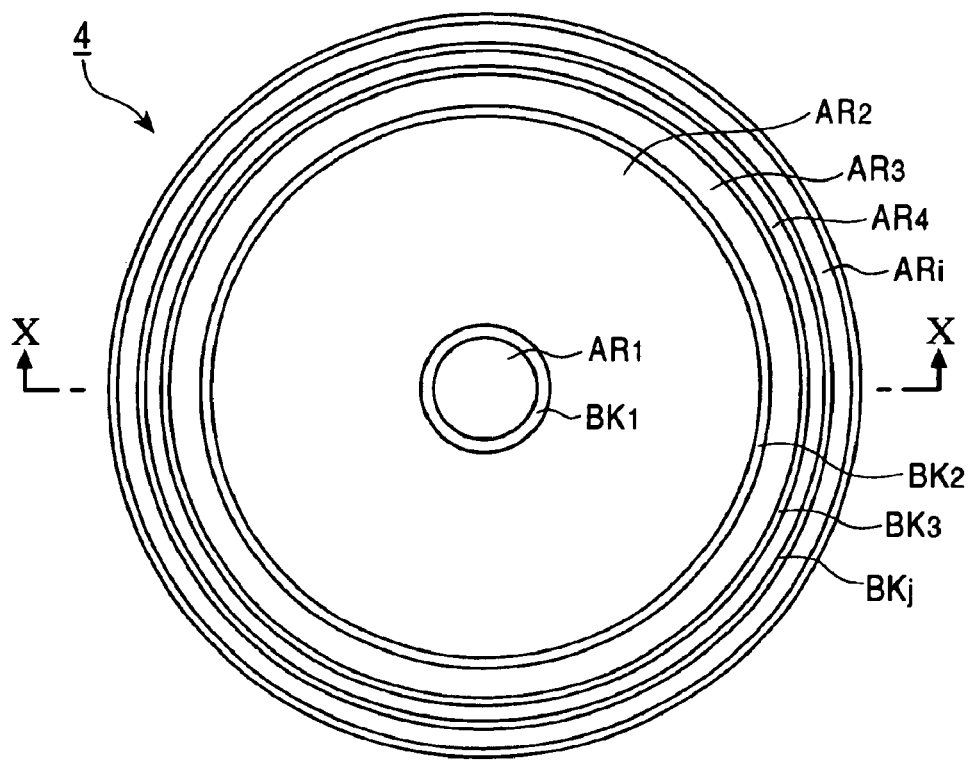
FIG. 4 is a top plan view illustrating the shape of the aberration correcting optical unit.
Figure 7:
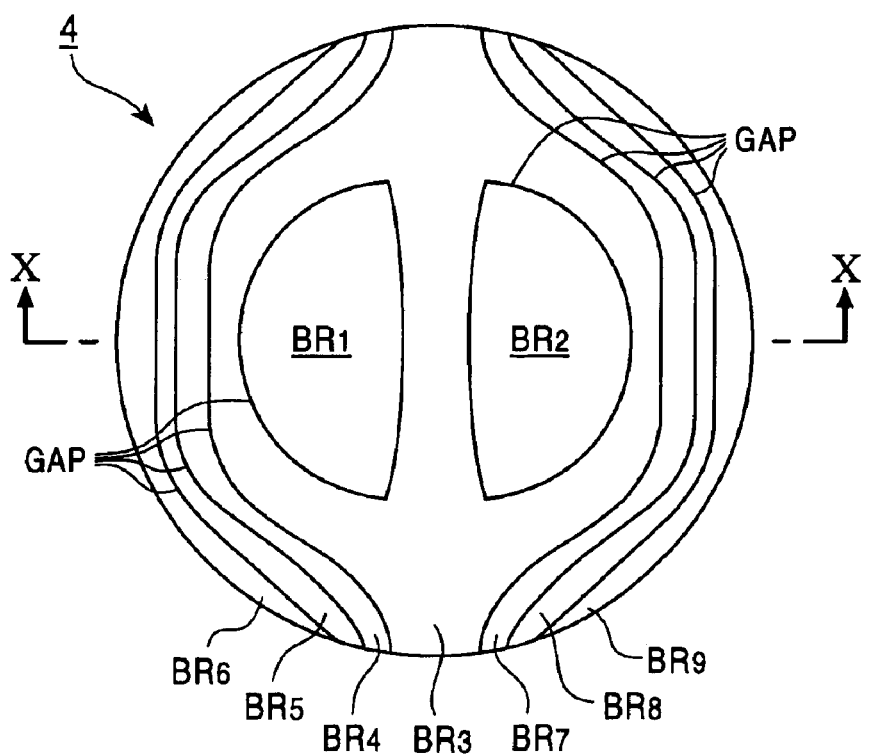
FIG. 7 is a top plan view illustrating the shape of another aberration correcting optical unit.

The aberration correcting optical unit 4 is partitioned into a plurality of aberration correcting regions AR1–ARi which have been determined in correspondence to the distribution of aberration caused by the optical disc 9, as illustrated in a top plan view of FIG. 4. The aberration correcting regions AR1–ARi are implemented by transparent electrode (ITO: Indium Tin Oxide) layers formed in the electrodes 12, 13. It should be noted that while FIG. 4 illustrates a typical example of the aberration correcting regions AR1, AR2–ARi for correcting spherical aberration caused by the optical disc 9, the aberration correcting optical unit 4 is actually partitioned into a variety of shapes in correspondence to the distribution of particular aberration caused by the optical disc 9. For example, for correcting coma aberration caused by the optical disc 9 which is inclined during recording or reproduction of information, the aberration correcting optical unit 4 is provided with aberration correcting regions BR1–BR9 of shapes as illustrated in FIG. 7. Also, the number of sections of the aberration correcting regions is determined in correspondence to the distribution of aberration caused by the optical disc 9.

Figure 5:
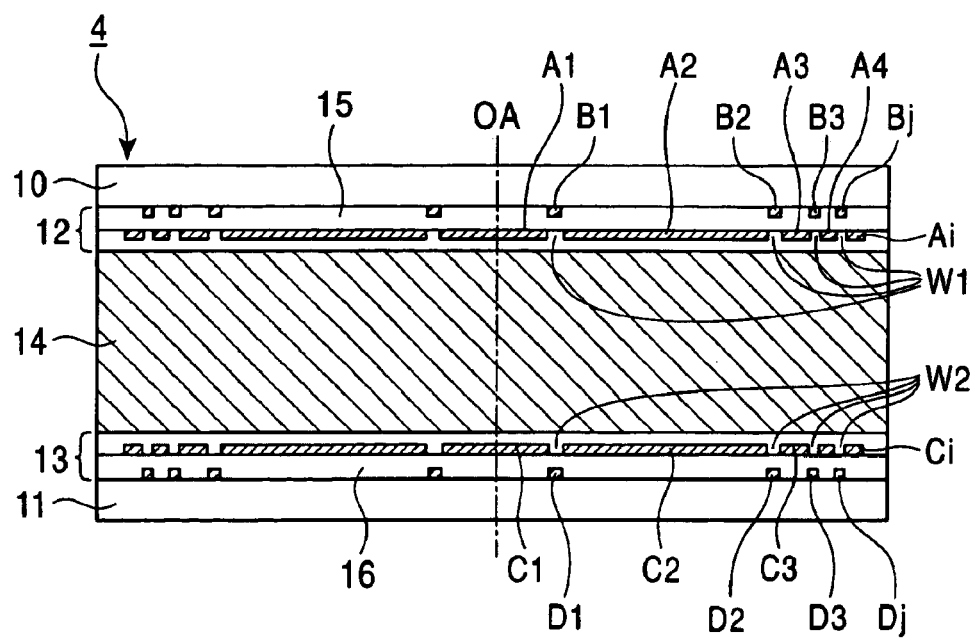
FIG. 5 is a cross-sectional view illustrating the vertical cross-sectional structure of the aberration correcting optical unit.

When the aberration correcting optical unit 4 is provided with the concentric aberration correcting regions AR1–ARi as illustrated in FIG. 4, the electrode 12 includes transparent electrode layers A1–Ai embedded in a transparent insulating layer 15 in an electrically isolated relationship with each other; and transparent electrode layers B1–Bj embedded in the insulating layer 15 opposed to a plurality of gaps W1 existing between the respective transparent electrode layers A1–Ai, as illustrated in a cross-sectional view of FIG. 5 (a diagram illustrating the cross-sectional structure taken along a line X—X in FIG. 4). Also, the group of the transparent electrodes A1–Ai and the group of the transparent electrode layers B1–Bj are formed in a two-stage structure within the insulating layer 15 along the optical axis OA. For convenience of description, the insulating films 23, 24 and the liquid crystal alignment films 21, 22 are omitted in the cross-sectional view of FIG. 5 (the same is applied likewise to FIGS. 6, 8, 12, 13, 14).

The transparent electrode layer A1 is formed in a shape that conforms to the aberration correcting region AR1 (circular in FIG. 4); the transparent electrode A2 is formed in a shape that conforms to the aberration correcting region AR2 (annular in FIG. 4); and the remaining transparent electrode layers A3–Ai are likewise formed in shapes which conform to the corresponding aberration correcting regions AR3–ARi.

The transparent electrode layer B1 in turn is formed in an extremely narrow annular shape that conforms to the shape of the gap W1 for electrically isolating the transparent electrode layers A1, A2. The transparent electrode layer B2 is likewise formed in an extremely narrow annular shape that conforms to the shape of the gap W1 for electrically isolating the transparent electrode layers A2, A3, and the remaining transparent electrode layers B3–Bj are formed in a similar manner.

In other words, the aberration correcting regions AR1–Ari illustrated in FIG. 4 are implemented by forming the transparent electrodes A1–Ai in an electrically isolated structure, while the respective gaps BK1–BKj between the aberration correcting regions AR1–ARi are implemented by forming the transparent electrodes B1–Bj.

It should be noted that while these transparent electrodes B1–Bj may be arranged opposed to all of the existing gaps W1, they may be formed opposed to a number of gaps W1 which may be required in accordance with the characteristic of a particular aberration to be corrected.

On the other hand, the electrode 13 has a similar two-stage structure comprised of a group of transparent electrode layers C1–Ci embedded in a transparent insulating layer 16 in an electrically isolated relationship with each other, and a group of transparent electrode layers D1–Dj embedded in the insulating layer 16 opposed to a plurality of gaps W2 existing between the respective transparent electrodes C1–Ci. The transparent electrode layers C1–Ci are in an opposed relationship with the transparent electrode layers A1–Ai of the electrode 12, while the transparent electrode layers D1–Dj are in an opposing relationship with the transparent electrode layers B1–Bj of the electrode 12.

It should be noted that while the transparent electrode layers D1–Dj may also be arranged opposed to all of the existing gaps W2, they may be formed opposed to a number of gaps required in accordance with the characteristic of particular aberration to be corrected.

Figure 6:
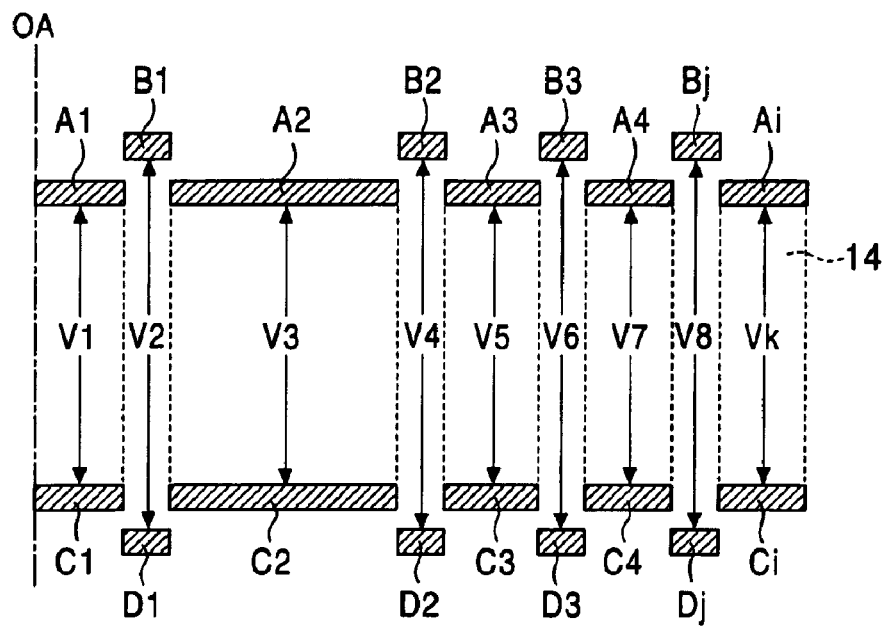
FIG. 6 is a diagram illustrating the principle of the aberration correction by means of the aberration correcting optical unit.

Then, as schematically illustrated in FIG. 6, when appropriate, different voltages V1–Vk are applied respectively across the respective transparent electrode layers (A1, C1)–(Ai, Ci) of the aberration correcting regions AR1–ARi in a mutually opposed relationship as well as the respective transparent electrode layers (B1, D1)–(Bj, Di) of the gaps BK1–BKj by the control voltage Vi from the control circuit 8, the applied voltages V1–Vk cause a plurality of alignment states to occur within the liquid crystal element 14. The voltages V1–Vk are determined to be such voltages that provide the alignment states of the liquid crystal element 14 in the respective aberration correcting regions AR1–ARi and the gaps BK1–BKj with the characteristics opposite to the characteristic of aberration caused by the optical disc 9.

In this way, even with the gaps BK1–BKj interposed between the respective aberration correcting regions AR1–ARi, the transparent electrode layers B1–Bj, D1–Dj are provided for the gaps BK1–Bkj, so that the alignment states can be adjusted for correcting aberration over the entire region of the liquid crystal element 14, and the alignment states can be finely adjusted.

Also, as the voltages V1–Vk across the respective transparent electrode layers (B1, D1)–(Bj, Di) are adjusted as appropriate, their alignment states can be changed continuous with the alignment states produced by the voltages applied across the transparent electrode layers (A1, C1)–(Ai, Ci), without causing any abrupt change.

Figure 8:
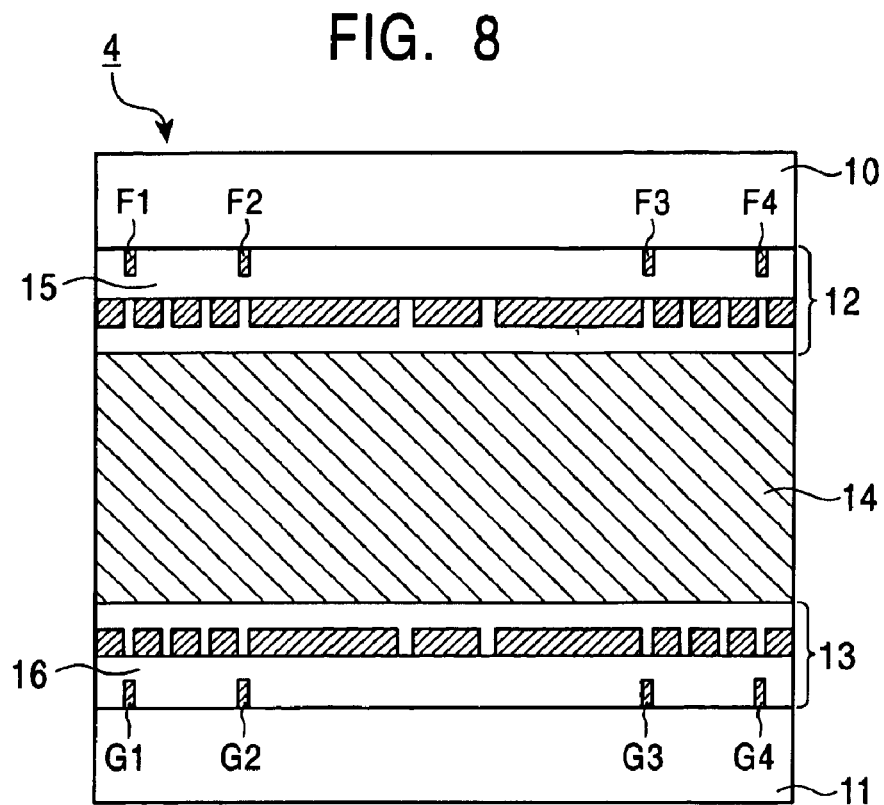
FIG. 8 is a cross-sectional view illustrating the vertical cross-sectional structure of the aberration correcting optical unit in FIG. 7.

Likewise, with an aberration correcting optical unit 4 having the aberration correcting regions BR1–BR9 for correcting coma aberration as illustrated in FIG. 7, transparent electrode layers (reference numerals of which are omitted) corresponding to the aberration correcting regions BR1–BR9, and transparent electrode layers corresponding to gaps between the aberration correcting regions BR1–BR9 are formed on the electrodes 12, 13, respectively, in a two-stage structure, as illustrated in a cross-sectional view of FIG. 8 (which is a diagram illustrating the cross-sectional structure taken along a line X—X in FIG. 7). It should be noted that FIG. 8 shows that the transparent electrode layers corresponding to the gaps between the respective aberration correcting regions BR1–BR9 are not formed opposed to all the gaps but are provided only for those gaps in which the influence of coma aberration should be particularly reduced, as indicated by reference numerals F1–F4, G1–G4.

The operation of the optical pickup apparatus PU having the aberration correcting optical unit 4 constructed as described will be explained with reference to FIGS. 2 and 7–11. The operation of the apparatus will be explained as a representative example in which the optical pickup apparatus PU is provided with the aberration correcting optical unit 4 for correcting coma aberration illustrated in FIGS. 7 and 8.

When an optical disc 9 is loaded at a so-called clamp position in an information recording/reproducing apparatus, and the user instructs the information recording/reproducing apparatus to start reproduction of information, a system controller (not shown) provided in the information recording/reproducing apparatus commands the control circuit 8 to output a control voltage Vi for correcting coma aberration. Consequently, appropriate voltages are applied respectively across the transparent electrode layers in the opposed relationship corresponding to the respective aberration correcting regions BR1–BR9 of the aberration correcting optical unit 4 illustrated in FIGS. 7 and 8, and across the transparent electrode layers F1–F4, G1–G4 in the opposed relationship corresponding to the gaps, causing a plurality of alignment states to change in accordance with associated electric fields produced by the applied voltages in the liquid crystal element 14.

The system controller drives a spindle motor (not shown) provided in the information recording/reproducing apparatus for rotation. The system controller also drives a carriage (not shown) for moving the optical pickup apparatus PU in a radial direction of the optical disc 9. The optical disc 9 is rotated at a predetermined line velocity.

Further, the light source 1 emits linearly polarized laser light H1 having a constant power as the system controller supplies a driving signal to the light source 1. The laser beam H1 is transformed into collimated beam by a collimator lens 2. The collimated beam, then, transmits the polarizing beam splitter 3, and is incident on the aberration correcting optical unit 4.

The laser beam incident on the aberration correcting optical unit 4 is subjected to birefringence in accordance with the alignment state of the liquid crystal element 14 when it transmits the aberration correcting optical unit 4. The laser beam subjected to the birefringence is converged by the objective lens 5, and a resulting light beam having a smaller irradiation diameter is irradiated on the optical disc 9.

Further, reflected light produced by the light beam reflected off a pupil plane of the optical disc 9 is incident on the objective lens 5. The reflected light transmitting the objective lens 5 is again subjected to the birefringence by the aberration correcting optical unit 4 and transmits the same, and then is reflected by the polarizing beam splitter 3 toward the converging lens 6. Then, the reflected light is converged by the converging lens 6 to be received by the photodetector 7. The photodetector 7 transduces the received reflected light to output an optoelectrically-transduced signal having information recorded on the optical disc 9. The transduced signal is supplied to a reproduced signal processing circuit (not shown) provided in the information recording/reproducing apparatus. Finally, the reproduced signal processing circuit performs decoding and so on based on the transduced signal to produce a reproduced signal such as an audio signal and/or a video signal.

Coma aberration occurs on the pupil plane of the optical disc 9 when the optical disc 9 is inclined and an incident angle of the light beam is inclined (tilt angle) with respect to the normal direction of the optical disc 9.

Figure 9:
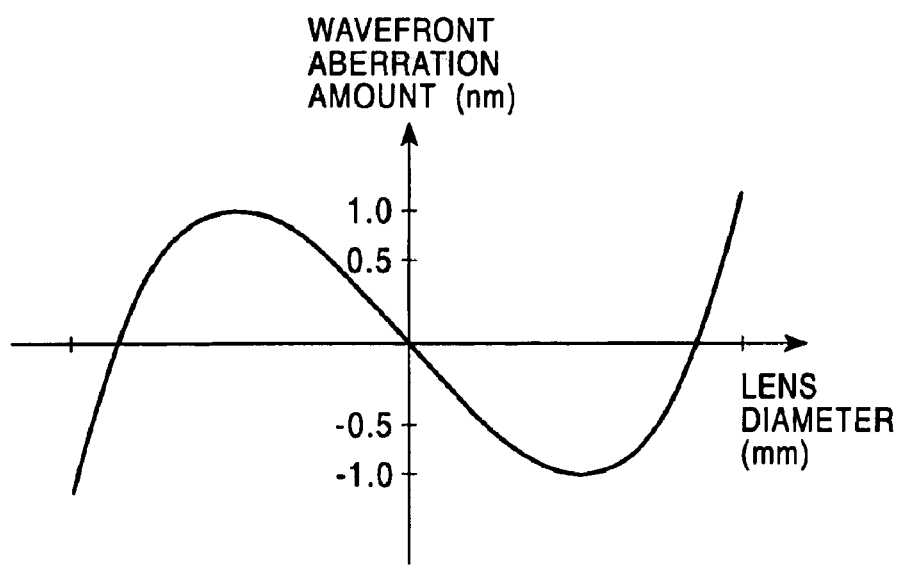
FIG. 9 is a graph showing the characteristic of coma aberration.

FIG. 9 is a graph which shows the influence of the coma aberration occurring on the pupil plane of the optical disc 9. The curve represents a normalized wave front aberration amount, where the horizontal axis represents an effective optical path range of the objective lens 5 (i.e., lens diameter).

When the coma aberration as shown in FIG. 9 occurs, the aberration correcting optical unit 4 causes birefringence to the laser beam incident thereon from the polarizing beam splitter 3 so as to reduce the influence of the coma aberration as described above, so that the optical disc 9 is irradiated beforehand with a light beam which can reduce the influence of the coma aberration through the objective lens 5. Further, when reflected light returning from the optical disc 9, influenced by the coma aberration, is again incident on the aberration correcting optical unit 4 through the objective lens 5, the light beam is given the birefringence to reduce the influence of the coma aberration on the reflected light, and passes through the aberration correcting optical unit 4 to the polarizing beam splitter 3. Consequently, the reflected light with suppressed influence of the coma aberration is incident on the photodetector 7 through the converging lens 6, thereby enabling highly accurate information reproduction.

Further, the gaps between the respective aberration correcting regions BR1–BR9 of the aberration correcting optical unit 4 are provided with the transparent electrode layers F1–F4, G1–G4 in an opposing relationship as illustrated in FIGS. 7 and 8, so that the coma aberration can be reduced over the entire aberration correcting optical unit 4, and the coma aberration can be accurately reduced.

Figure 10:
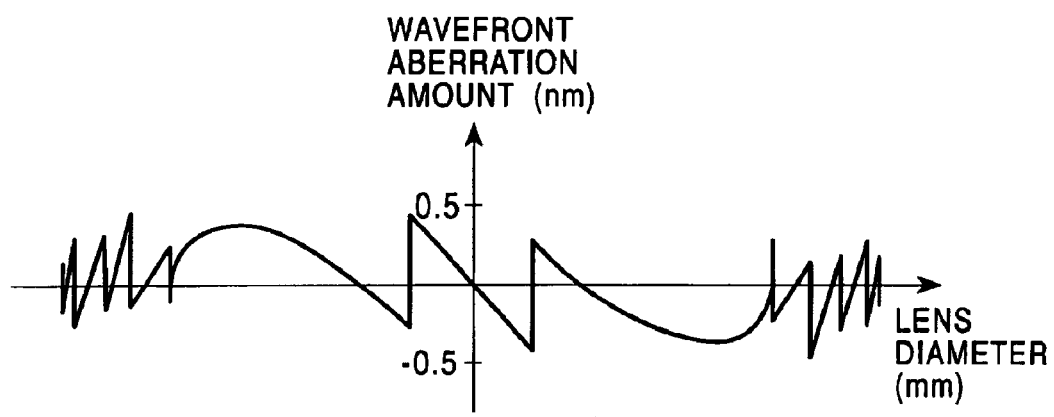
FIG. 10 is a characteristic graph showing the result of reducing the coma aberration by means of the aberration correcting optical unit.

FIG. 10 is a graph showing the influence of coma aberration reduced by the aberration correcting optical unit 4, which is represented as a normalized wave front aberration amount, wherein the horizontal axis represents an effective optical path range of the objective lens 5 (i.e., lens diameter). As is apparent from FIG. 10, a significant improvement is recognized as compared with the coma aberration before the correction shown in FIG. 9.

Figure 11:
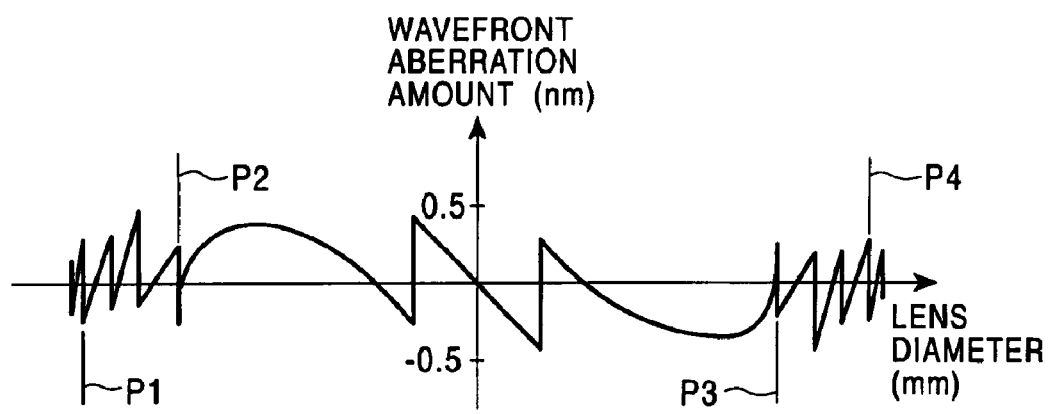
FIG. 11 is a graph showing the characteristic when the coma aberration is not sufficiently reduced.

FIG. 11 in turn shows the influence of coma aberration when only the aberration correcting regions BR1–BR9 are used to correct the aberration without providing the transparent electrode layers in the gaps between the respective aberration correcting regions BR1–BR9 of the aberration correcting optical unit 4, i.e., when the aberration is corrected without providing the transparent electrode layers F1–F4, G1–G4 illustrated in FIG. 8, for the purpose of comparison with the characteristic graph of FIG. 10.

It can be seen that the graph of FIG. 11 presents large peaks P1–P4 in the aberration in portions where the transparent electrode layers F1–F4, G1–G4 are not provided, whereas the peaks are largely reduced as shown in FIG. 10.

As is also apparent from the result of the experiment described above, it is confirmed that according to the aberration correcting optical unit 4 of the embodiment, the influence of the coma aberration can be largely reduced by the transparent electrode layers F1–F4, G1–G4 provided between the gaps between the respective aberration correcting regions BR1–BR9.

The operation of the optical pickup apparatus PU for recording information will be described.

As the user instructs the information recording/reproducing apparatus to start recording of information, the system controller provided in the information recording/reproducing apparatus commands a recording signal processing circuit (not shown) to perform modulation, encoding and so on based on an input signal such as an audio signal and a video signal supplied from the outside, and provides the light source 1 with a recording signal produced by such processing, causing the light source 1 to emit laser light H1 modulated by the recording signal.

The laser beam H1 is transformed into collimated light beam by the collimator lens 2, transmits the polarizing beam splitter 3, and is incident on the aberration correcting optical unit 4. The laser beam incident on the aberration correcting optical unit 4 is subjected to birefringence in accordance with the alignment state of the liquid crystal element 14 when it transmits the aberration correcting optical unit 4. The laser beam subjected to the birefringence is converged by the objective lens 5, and a resulting light beam having a smaller irradiation diameter is irradiated to the optical disc 9 for recording information with optical energy of the light beam.

Further, reflected light produced by the light beam reflected from a pupil plane of the optical disc 9 is incident on the objective lens 5. The reflected light transmitting the objective lens 5 is again subjected to the birefringence by the aberration correcting optical unit 4 and transmits the same, and then is reflected by the polarizing beam splitter 3 toward the converging lens 6. Then, the reflected light is converged by the converging lens 6, such that the resulting converged light beam is received by the photodetector 7. The photodetector 7 optoelectrically transduces the received reflected light to output the transduced signal, which is supplied to a servo circuit (not shown) provided in the information recording/reproducing apparatus.

The servo circuit detects a focus error, for example, by an astigmatism method, and drives the objective lens 5 in a focus servo scheme based on the result of the detection. Since the focus servo is performed based on the optoelectrically transduced signal with significantly reduced influence of coma aberration, highly accurate focus servo can be accomplished.

When the optical pickup apparatus is provided with the aberration correcting optical unit 4 for correcting spherical aberration illustrated in FIGS. 4 and 5, the pickup apparatus can have similar effects to those produced when it is provided with the aberration correcting optical element 4 for correcting coma aberration illustrated in FIGS. 7 and 8, so that the influence of various types of aberration can be significantly reduced.

As described above, according to the optical pickup apparatus PU and the information recording/reproducing apparatus of the embodiment, it is possible to significantly reduce the influence of aberration by the optical disc 9 and to finely control the reduction of the aberration, since the optical pickup apparatus PU is provided with the aberration correcting optical unit 4, and the transparent electrode layers are disposed corresponding to the gaps defined between the respective aberration correcting regions of the aberration correcting optical unit 4, as illustrated in FIGS. 5 and 8.

While the foregoing embodiment has been described for the aberration correcting optical unit 4 which includes the transparent electrode layers corresponding to the gaps defined between the respective aberration correcting regions, the aberration correcting optical unit of the present invention is not limited to such a structure.

Figure 12:
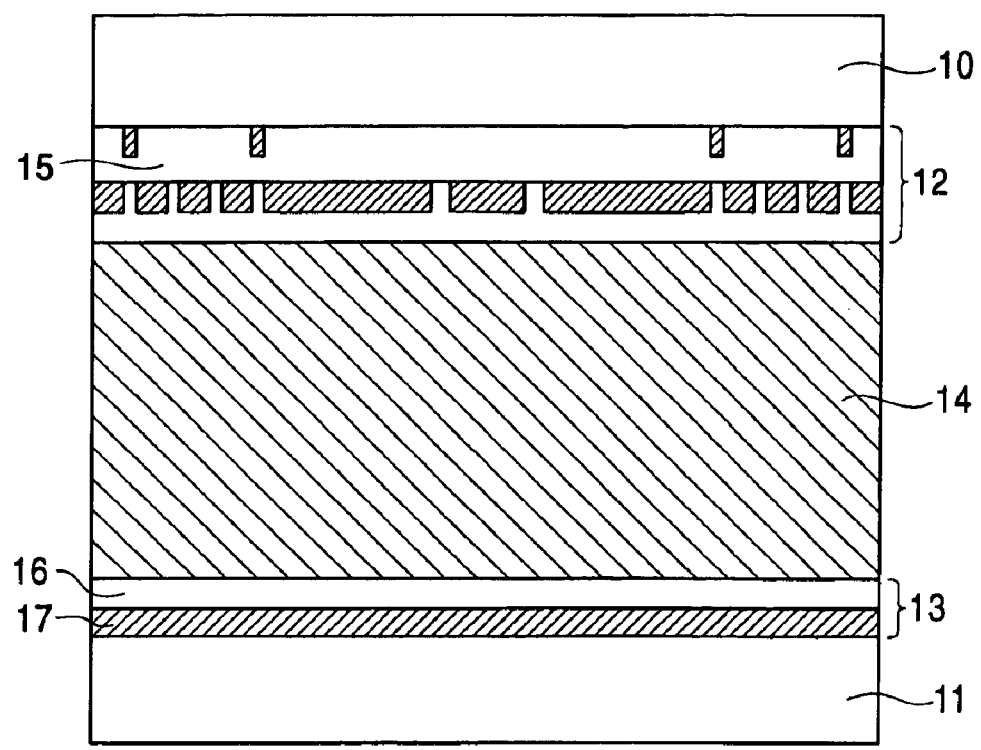
FIG. 12 is a cross-sectional view illustrating another structure of the aberration correcting optical unit.

Alternatively, as illustrated in a cross-sectional view of FIG. 12, transparent electrode layers may be provided corresponding to gaps defined between respective aberration correcting regions on one electrode 12, while a transparent electrode layer 17 is provided over the entirety of the effective optical path range on the other electrode 13, such that the transparent electrode layer 17 is used as a common electrode to apply appropriate voltages respectively between the respective transparent electrode layers in the electrode 13 and the transparent electrode layer 17.

Figure 13:
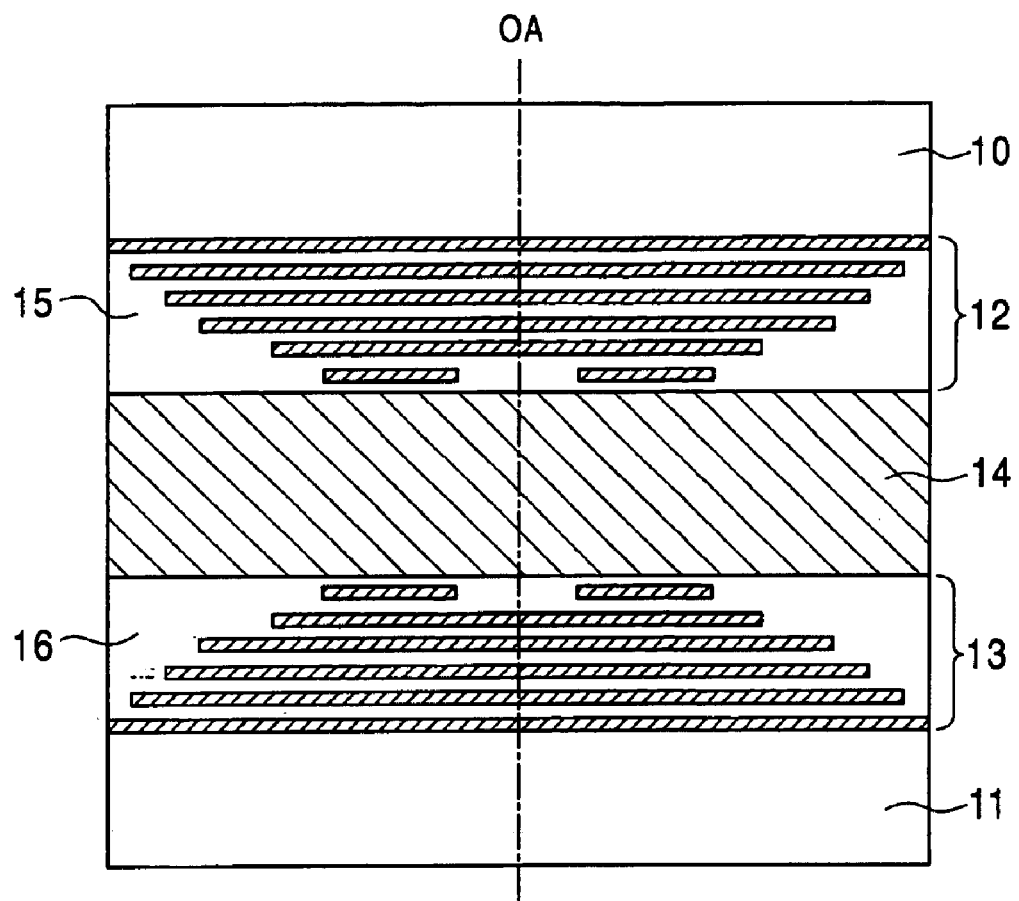
FIG. 13 is a cross-sectional view illustrating a further another structure of the aberration correcting optical unit.

Also alternatively, as illustrated in a cross-sectional view of FIG. 13, a plurality of transparent electrode layers overlapping one another may be formed along the optical axis OA in a multi-stage structure in each of the electrodes 12, 13, such that appropriate voltages may be applied respectively between the transparent electrode layers in a mutually opposing relationship having shapes corresponding to associated aberration correcting regions. In other words, portions of the respective transparent electrode layers opened to the liquid crystal element 14 are made to conform to the shapes of the aberration correcting regions, thereby allowing for a correction of aberration. Since such a structure is free from gaps otherwise existing between the aberration correcting regions, the transparent electrode layers such as those illustrated in FIGS. 5 and 8 are not required corresponding to the gaps. Further effects can be provided in realizing simplification of the control circuit 8 resulting from a reduction in the number of wirings for applying voltages to the transparent electrode layers, and a reduction in the number of types of voltages to be applied, and so on.

Also, in the structure of FIG. 13, a single transparent electrode layer, similar to the transparent electrode layer 17 illustrated in FIG. 12, may be formed on one electrode 12 (or 13), such that the single transparent electrode layer is used as a common electrode.

Figure 14:
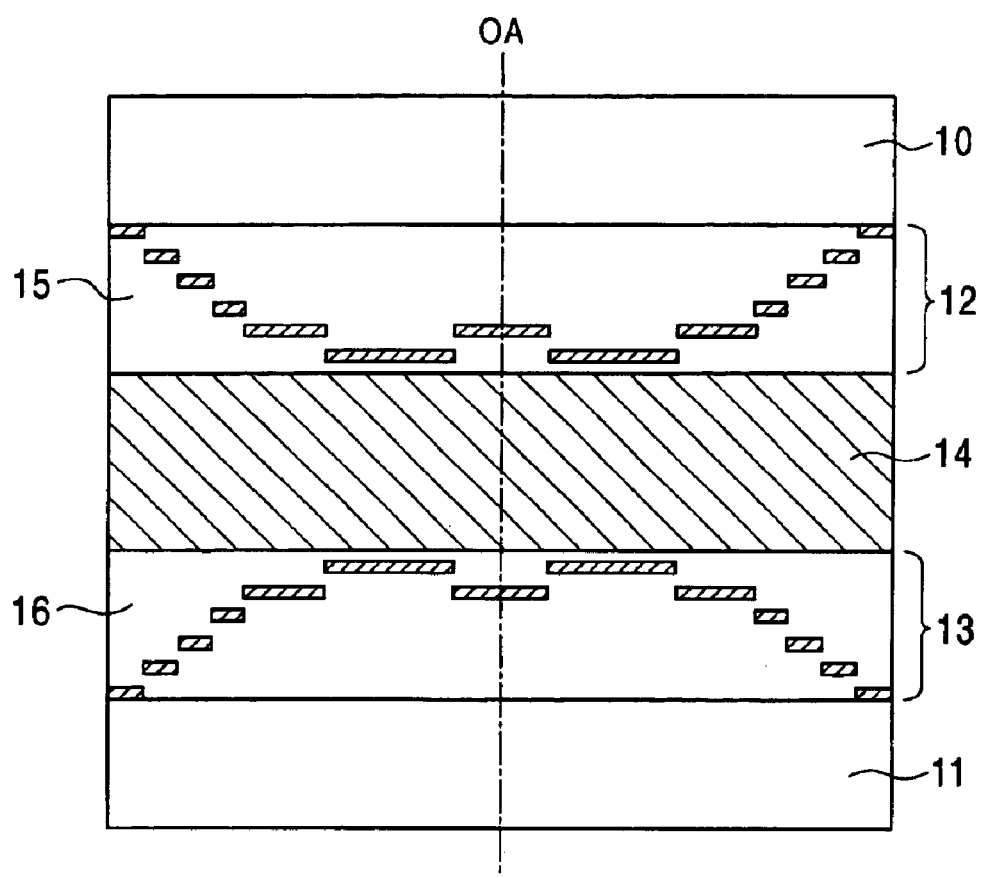
FIG. 14 is a cross-sectional view illustrating a further another structure of the aberration correcting optical unit.

Further alternatively, as illustrated in a cross-sectional view of FIG. 14, transparent electrode layers of shapes corresponding to aberration correcting regions may be formed in a multi-stage structure along the optical axis OA, such that appropriate voltages are respectively applied across transparent electrode layers in a mutually opposing relationship.

According to the foregoing structure, it is possible to finely adjust the alignment states which should be caused in the liquid crystal element 14, since the shapes of the transparent electrode layers can be formed to conform to the shapes of the aberration correcting regions. Thus, realization of more accurate aberration correcting optical unit can be attained. Also, the transparent electrode layers such as those illustrated in FIGS. 5 and 8 are not required corresponding to the gaps, since no gaps exist between transparent electrode layers. Further effects can be provided in realizing simplification of the control circuit 8 resulting from a reduction in the number of wirings for applying voltages to the transparent electrode layers, and a reduction in the number of types of voltages to be applied, and so on.

As described above, according to the foregoing embodiment, at least one of mutually opposing electrodes for applying a voltage to the liquid crystal element of the aberration correcting optical unit is formed by a plurality of electrodes in a multi-layer structure, so that the plurality of electrodes can be oriented toward the liquid crystal element without gaps. Thus, an electro-optical effect is produced in the liquid crystal element without any gap when voltages are applied to the plurality of electrodes, so that the aberration can be corrected without any omission. Also, the aberration can be finely corrected.

Further, it is possible to promote a higher NA of an objective lens and a shorter wavelength for light emitted from a light source, which is associated with the trend of increasing the density of the information recording media, because of the ability of appropriately correcting aberration by an information recording medium, thereby providing an aberration correcting optical unit which is effective for the trend of increasing the density.

Also, highly accurate information recording and information reproduction can be accomplished since the optical pickup apparatus as well as the information reproducing apparatus and the information recording apparatus of the present invention comprise the aforementioned aberration correcting optical element to make an aberration correction.

The following description will be made on a liquid crystal element and an aberration correcting optical unit which has insulating layers between electrode layers according to another embodiment of the present invention.

Figure 15:
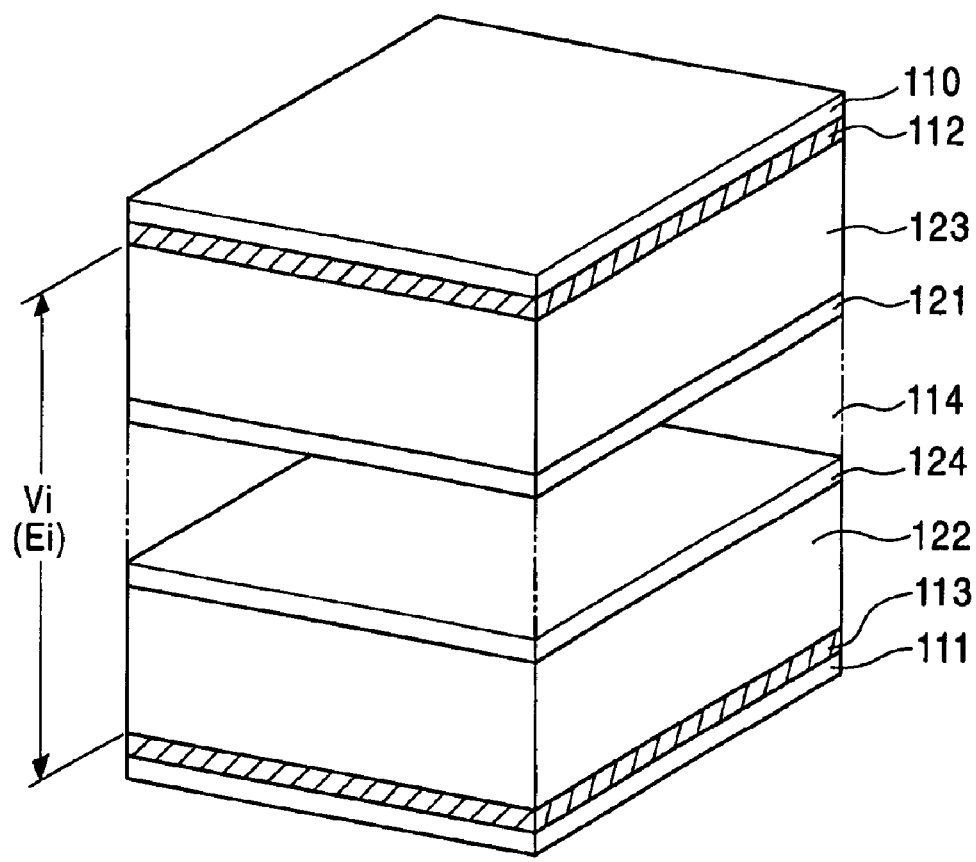
FIG. 15 is a perspective view schematically illustrating the structure of an aberration correcting liquid crystal unit and a change in alignment of crystal molecules.

In the embodiment, an optical unit 4 has a structure in which a liquid crystal element 114 is sandwiched between two transparent insulating substrates 110, 111 such as glass substrates, as schematically illustrated in FIG. 15. There are formed electrodes 112, 113, insulating layers 123, 124, and liquid crystal alignment layers 121, 122, respectively, on the mutually opposed surfaces of the insulating substrates 110, 111.

Alignment of liquid crystal molecules in the liquid crystal element 114 changes in response to an electric field Ei produced by a control voltage Vi which is applied between the electrodes 112, 113. As a result, light passing through the liquid crystal element 114 is subject to birefringence of the liquid crystal element 114 to change the phase. The polarization state (phase) can be controlled by the control voltage Vi applied to the liquid crystal element 114.

The aberration correcting optical unit 4 also has bidirectional light transmissivity, so that any side of the insulating substrates 10, 11 may be oriented to the objective lens 5.

Figure 16:
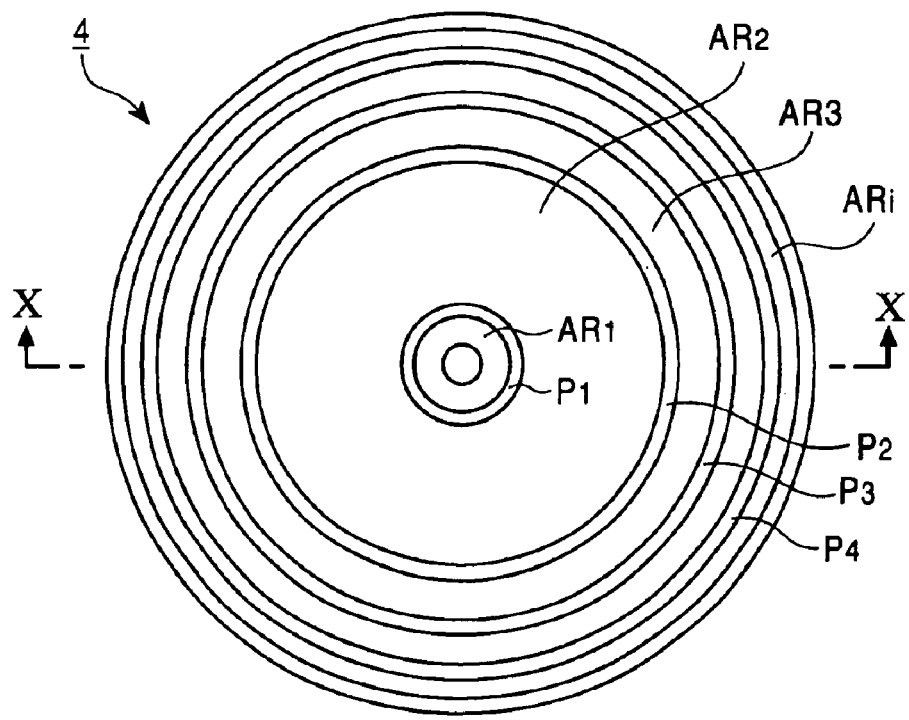
FIG. 16 is a top plan view of an aberration correcting optical unit for correcting spherical aberration.
Figure 17:
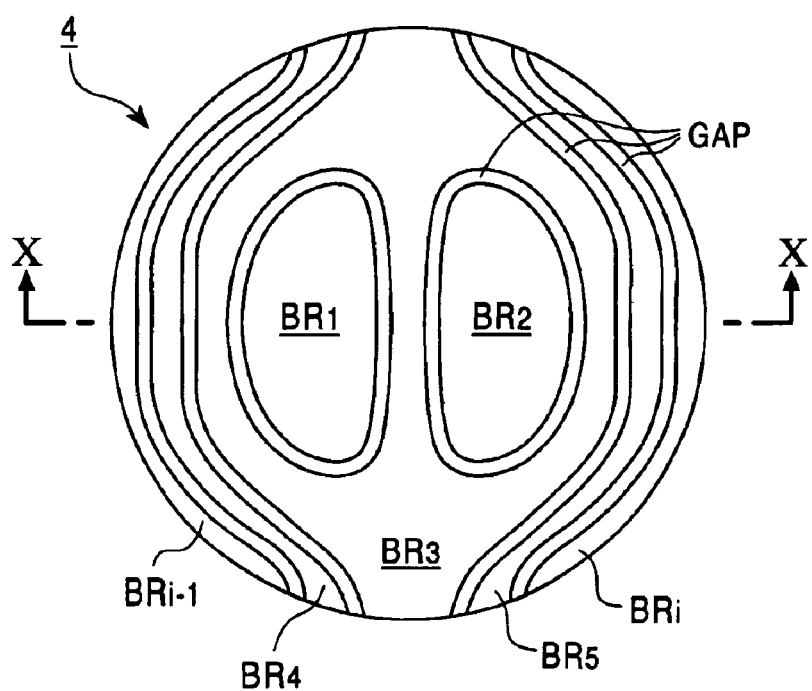
FIG. 17 is a top plan view of an aberration correcting optical unit for correcting coma aberration.

The aberration correcting optical unit 4 is partitioned into a plurality of aberration correcting regions AR1–ARi which have been determined in correspondence to the distribution of aberration caused by the optical disc 9, as illustrated in a top plan view of FIG. 16. The aberration correcting regions AR1–ARi are implemented by transparent electrode (ITO: indium tin oxide) layers formed in the electrodes 112, 113. It should be noted that while FIG. 16 illustrates a typical example of the aberration correcting regions AR1–ARi for correcting spherical aberration caused by the optical disc 9, the aberration correcting optical unit 4 is actually partitioned into a variety of shapes in correspondence to the distribution of aberration caused by the optical disc 9. For example, the aberration correcting optical unit 4 is provided with aberration correcting regions BR1–BRi of shapes as illustrated in FIG. 17 for correcting coma aberration caused by the optical disc 9 which is inclined during recording or reproduction of information. Also, the number of sections of these aberration correcting regions is determined in correspondence to the distribution of aberration by the optical disc 9.

Figure 18:
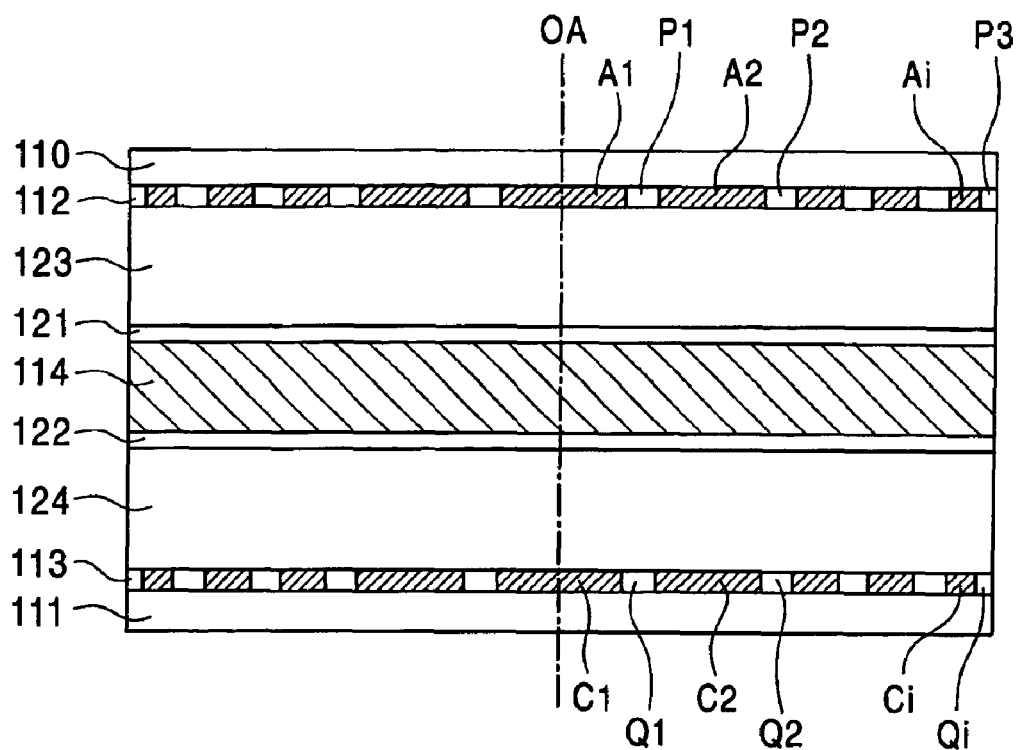
FIG. 18 is a cross-sectional view illustrating the structure of the aberration correcting optical unit illustrated in FIG. 16, taken along a line X—X.

In the following, description will be made on an example of the aberration correcting optical unit 4 which is provided with concentric aberration correcting regions AR1–ARi as illustrated in FIG. 16. FIG. 18 is a cross-sectional view illustrating the cross-sectional structure taken along a line X—X in FIG. 16. As illustrated, the electrode 112 has a structure comprised of transparent electrodes A1–Ai electrically isolated from one another by a plurality of gaps P1–Pi existing between the respective transparent electrodes A1–Ai.

The transparent electrode A1 is formed in a shape that conforms to the aberration correcting region AR1 (circular in FIG. 16); the transparent electrode A2 is formed in a shape that conforms to the aberration correcting region AR2 (annular in FIG. 16); and the remaining transparent electrodes A3–Ai are likewise formed in shapes which conform to the corresponding aberration correcting regions AR3–ARi. Also, the gaps P1–Pi isolating the transparent electrodes A1–Ai are formed in an annular shape.

The electrode 113 has a similar structure comprised of a plurality of transparent electrodes C1–Ci electrically isolated from one another by a plurality of gaps Q1–Qi existing between the respective transparent electrodes C1–Ci.

It should be noted that the electrode 113 need not be isolated if the electrode 112 is formed as isolated electrodes. For example, the electrode 113 may be formed as a single electrode extending over the entire plane of the layer, or may be formed in a shape required in accordance with the characteristic of particular aberration to be corrected, or formed separately in a required number.

It is disclosed that spherical aberration and coma aberration can be corrected by a single liquid crystal unit in Laid-open Japanese Patent Application Kokai No. H10-289465. Specifically, in the present invention, an upper electrode may be formed in a shape for correcting spherical aberration, while a lower electrode may be formed in a shape for correcting coma aberration, to correct the spherical aberration and the coma aberration with a single liquid crystal unit. In this event, an insulating layer between the upper electrode and a liquid crystal element and an insulating layer between the lower electrode and the liquid crystal element may have suitable thicknesses for allowing the corrections of the associated aberration, respectively.

Figure 19:
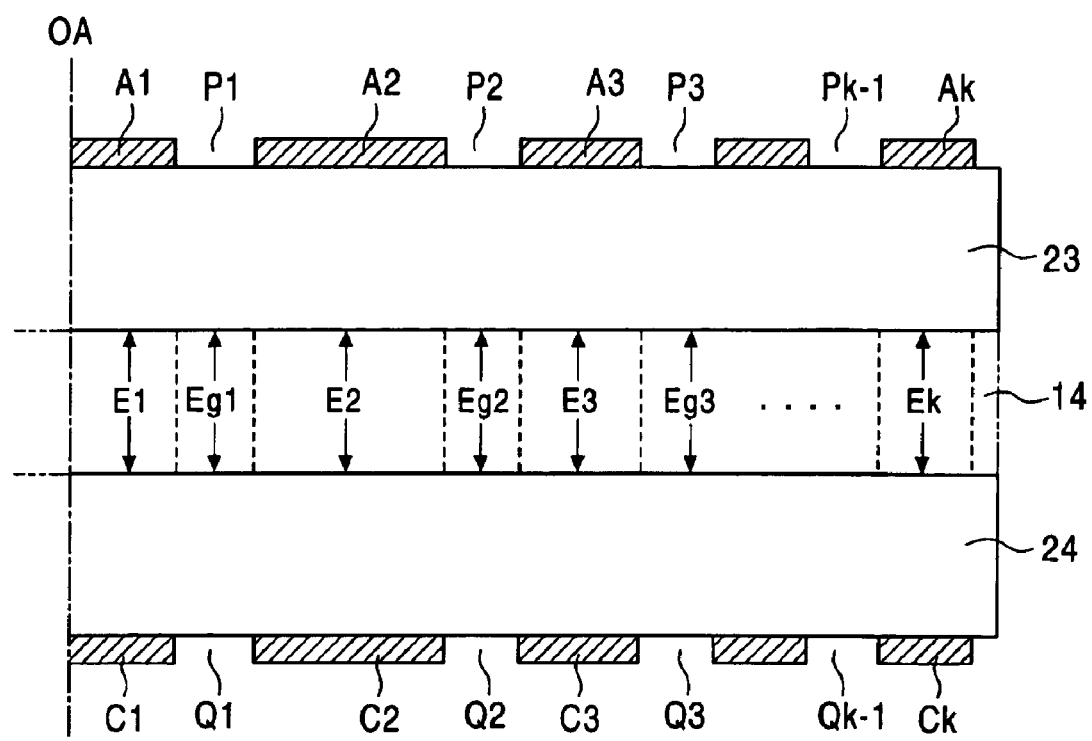
FIG. 19 is a cross-sectional view for explaining electric fields over a liquid crystal element in aberration correcting regions and gap regions when each transparent electrode is applied with a voltage.

Referring to FIG. 19, the following description will be made on the correction of aberration when the respective transparent electrodes are applied with voltages. For convenience of description, FIG. 19 illustrates a cross-section of the liquid crystal element in the radial direction from the center of the element. As schematically illustrated in FIG. 19, when different predetermined voltages V1–Vk are applied by the control circuit 8 across the respective transparent electrodes (A1, C1)–(Ak, Ck) of aberration correcting regions AR1–ARk which are in a mutually opposed relationship, a plurality of alignment states occur in the liquid crystal element 114 in accordance with electric fields (E1–Ek) produced by the applied voltages V1–Vk. The applied voltages V1–Vk are determined such that the alignment states of the liquid crystal element 114 in the respective aberration correcting regions AR1–ARk present the characteristics opposite to the characteristic of aberration caused by the optical disc 9, i.e., such that the aberration is corrected.

Figure 20:
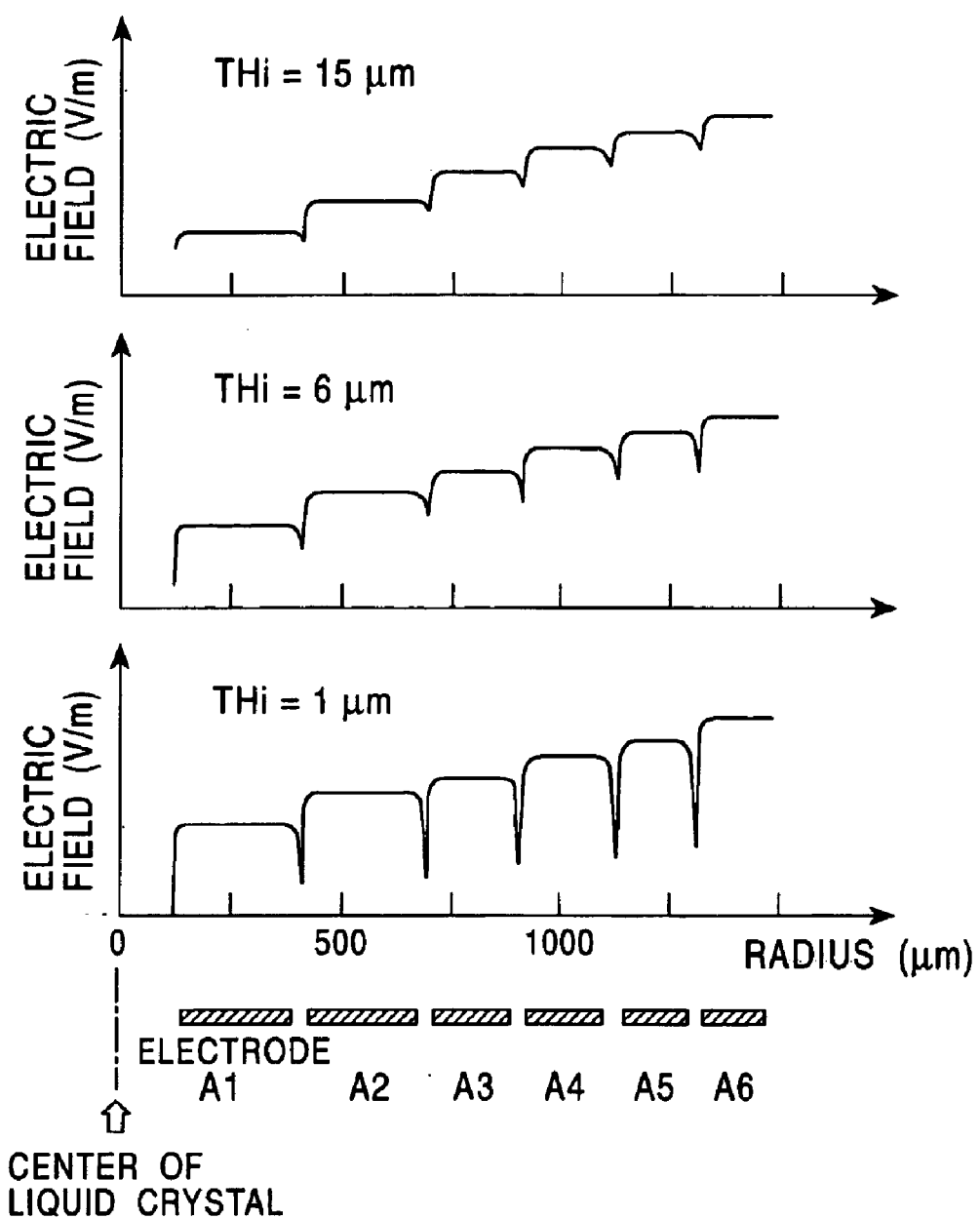
FIG. 20 shows graphs of the electric field intensities on interfaces between respective insulating layers and liquid crystal element, with the thickness (THi) of the insulating layers used as a parameter, when each electrode is applied with a voltage.

However, the electric fields (Eg1–Egk) produced in liquid crystal element portions corresponding to the gaps P1–Pk, Q1–Qk between the respective transparent electrodes vary depending on the thickness of the insulating layers 123, 124. FIG. 20 shows the intensity of the electric field on the interfaces of the insulating layers and the liquid crystal element portions, when the respective electrodes (here A1–A6) are applied with voltages, with the thickness of the insulating layers (THi) used as a parameter. In the graphs, it is assumed that the liquid crystal element has a thickness of 5 micrometers ($\mu$m), and the gaps P1–Pk, Q1–Qk have a width of 5 $\mu$m. The intensity of the electric field is shown for three thicknesses (THi) of the insulating films, i.e., THi=1, 6, 15 $\mu$m. Also, the respective electrodes are applied with voltages in increment of 2 volts, i.e., A1=10 (V), A2=12 (V), . . . , A6=20 (V).

As shown in FIG. 20, the electric field abruptly drops at the liquid crystal element portions corresponding to the gaps with a smaller thickness of the insulating films (THi=1 $\mu$m).

Therefore, the alignment of the liquid crystal cannot be sufficiently changed in these portions. In other words, it is difficult to correct the aberration since no phase difference can be produced in light passing therethrough. On the other hand, the reduction in the electric field is smaller when the thickness of the insulating films THi=6 μm. The electric field exhibits a substantially flat profile when the thickness of the insulating films THi=15 μm, so that the aberration can be sufficiently corrected by the liquid crystal element even in the gaps.

Figure 21:
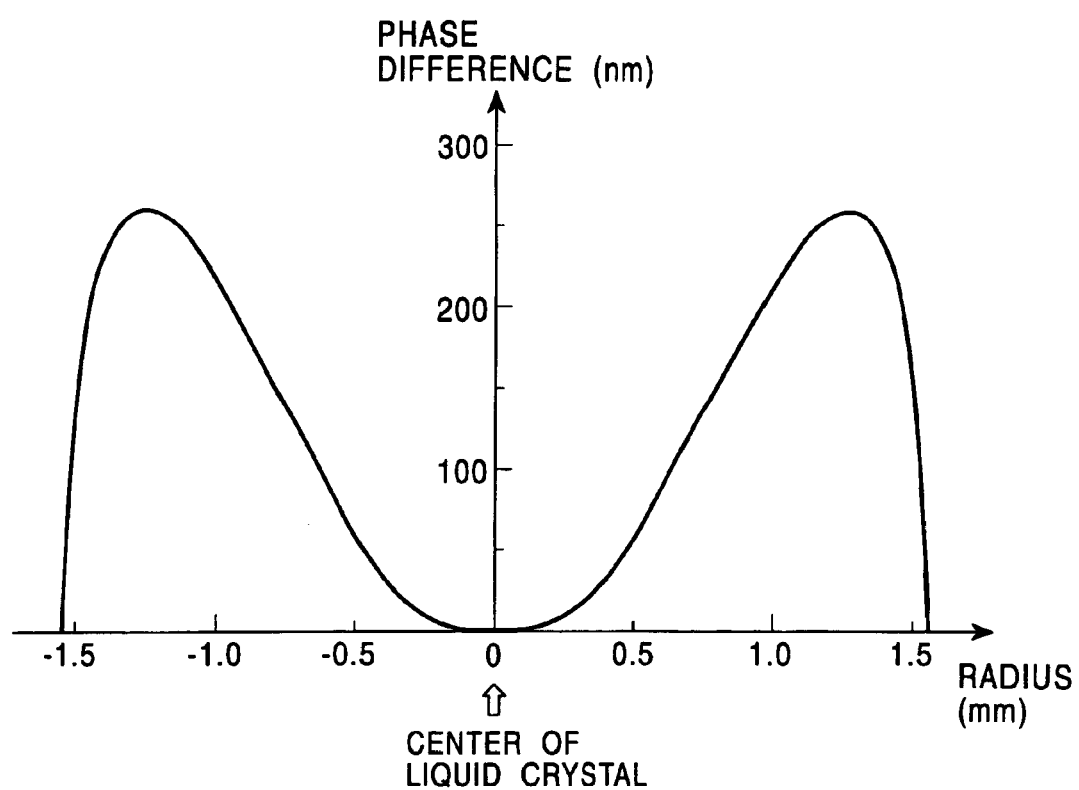
FIG. 21 is a graph showing an example of wave front aberration (spherical aberration) produced in a light beam by an optical disc.

FIG. 21 shows an example of wave front aberration (spherical aberration) produced by the optical disc 9. The amount of phase difference (in nanometer: nm) in a light incident plane of the liquid crystal element 114 is plotted in the radial direction with reference to the value at the center of the liquid crystal element 114. More specifically, a light beam incident on the liquid crystal element 114 has the phase difference of the profile shown in FIG. 21 with respect to the radial direction of the liquid crystal element 114. The aberration can be corrected by applying predetermined voltages to the liquid crystal element 114 for canceling out the phase difference to cause an in-plane phase change in the incident light beam.

Figure 22:
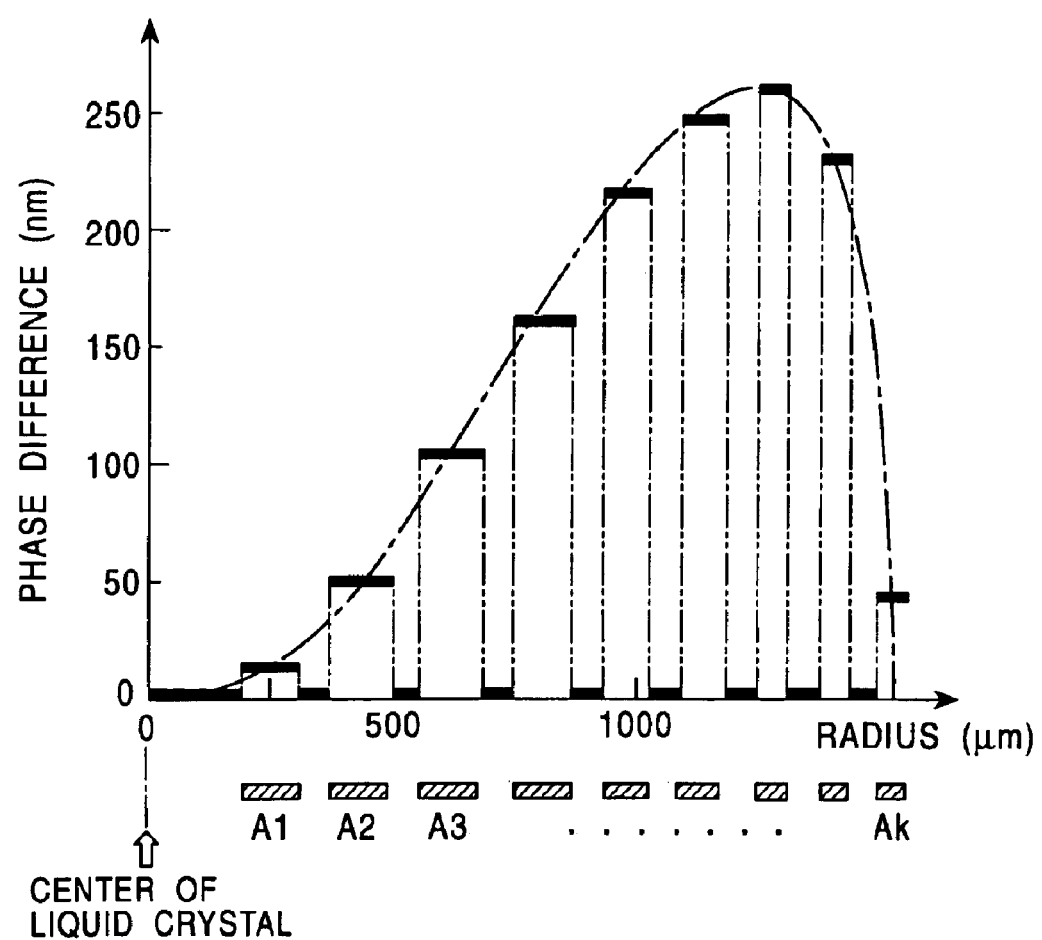
FIG. 22 is a graph showing a phase difference (nm) produced in a light beam passing through the liquid crystal element when predetermined voltages are applied to the liquid crystal element, when the thickness of an insulating layer is smaller than the thickness of the liquid crystal element.

FIG. 22 shows a phase difference (nm) produced in a light beam passing through the liquid crystal element 114 by a predetermined voltage applied to each electrode (A1–Ak, C1–Ck), when the insulating layer 123 sandwiched by the liquid crystal element 114 and the electrode layer 112 is smaller in thickness than the liquid crystal element 114 (for example, the thickness of the insulating layer 123 is equal to or less than approximately 1 μm, while the thickness of the liquid crystal element 114 is 5 μm). The phase difference is plotted with reference to the values in the gaps. In the aberration correcting region (AR1–ARk) of the liquid crystal element 114 corresponding to each electrode, a desired phase difference is obtained by the application of the voltage. On the other hand, since the electric field intensity is small in regions of the liquid crystal element 114 corresponding to the gaps P1–Pk, Q1–Qk, a phase change hardly occurs. Thus, abrupt discontinuity occurs in the phase difference, thereby significantly impeding the correction for the aberration.

Figure 23:
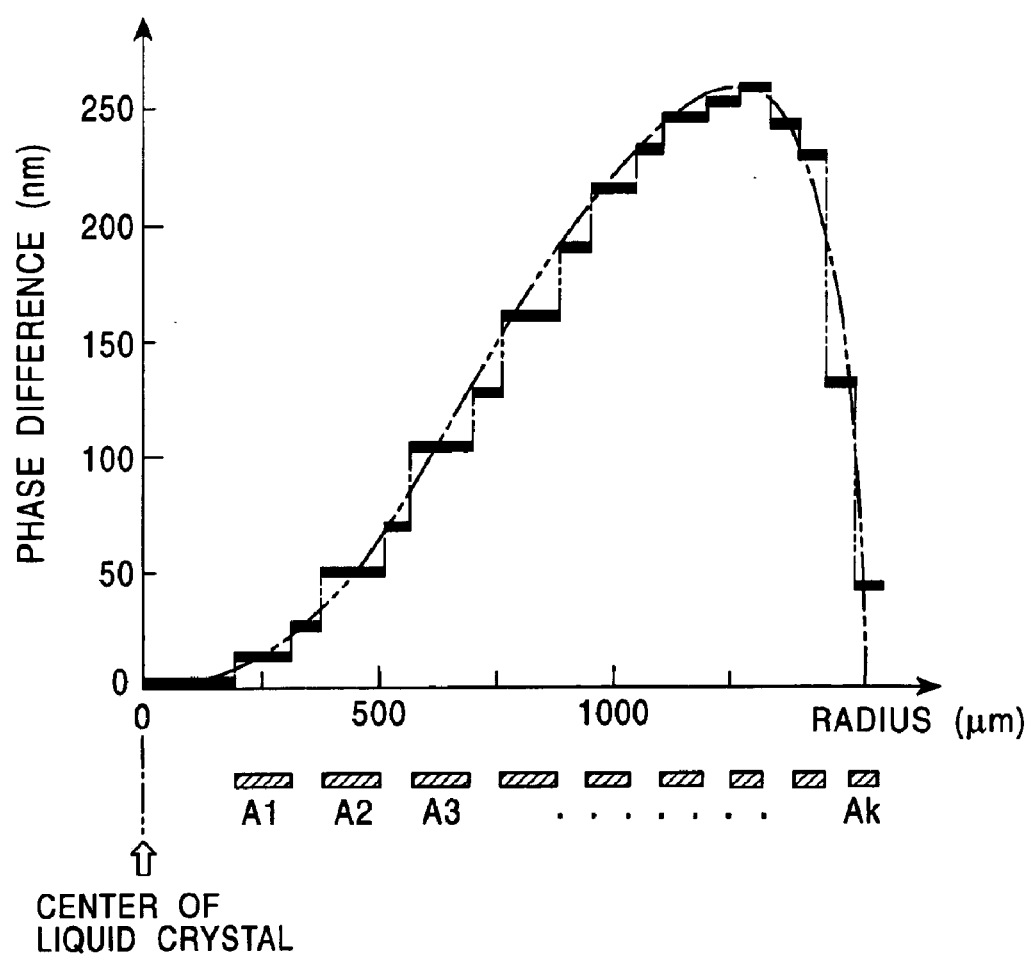
FIG. 23 is a graph showing a phase difference (nm) produced in a light beam passing through the liquid crystal element when predetermined voltages are applied to the liquid crystal element when the thickness of the insulating layer is equal to or larger than the thickness of the liquid crystal element.

FIG. 23 shows a phase difference produced in a light beam passing through the liquid crystal element 114 by the application of predetermined voltages when the insulating layer 123 of the liquid crystal element 114 has a thickness equal to or larger than the thickness of the liquid crystal element 114. As shown in the graph, the phase difference in a region of the liquid crystal element 114 corresponding to each of the gaps P1–Pk, Q1–Qk shows the value between the phase differences produced by two adjacent electrodes, so that the aberration is sufficiently corrected. It should be noted that the amount of phase difference is optimally coincident with the phase difference curve shown in FIG. 21 in the most favorable conditions.

Figure 24:
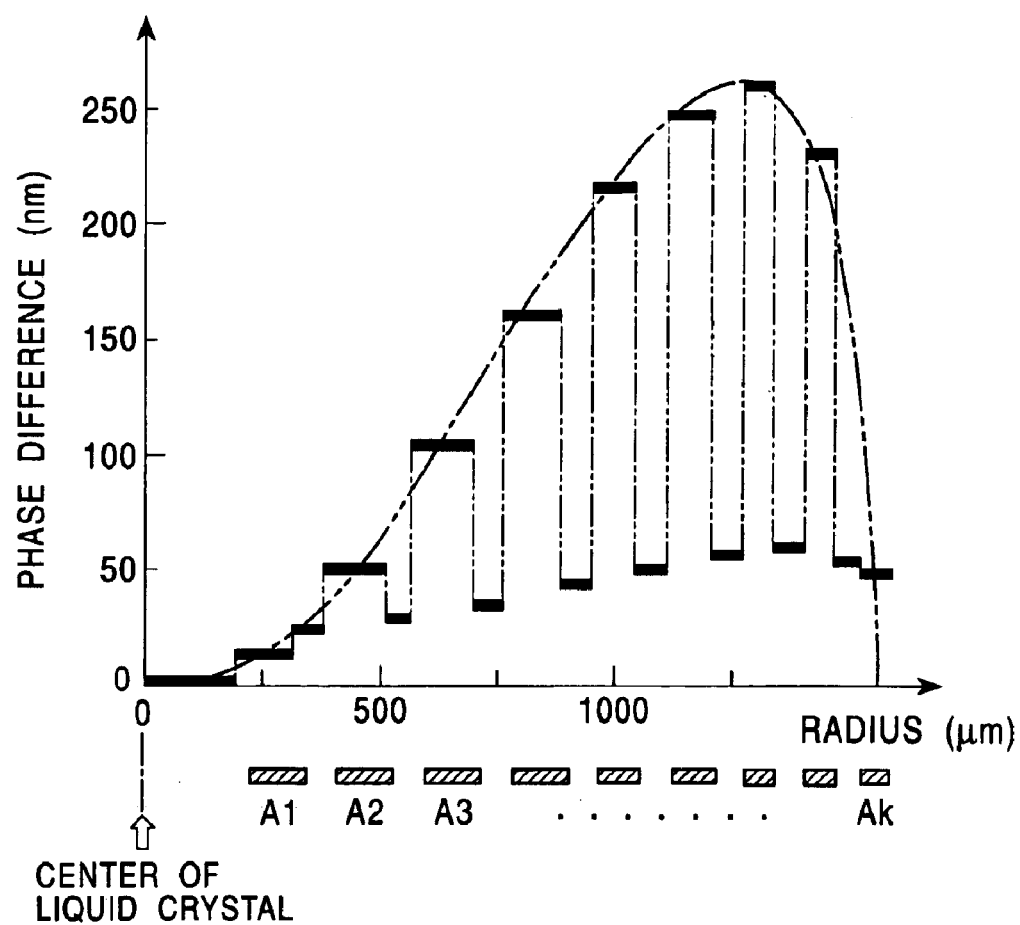
FIG. 24 is a graph showing a phase difference (nm) produced in a light beam passing through the liquid crystal element when the thickness of the insulating layer is smaller than the thickness of the liquid crystal element in another case.

FIG. 24 shows a phase difference produced in a light beam passing through the liquid crystal element 114 by the application of predetermined voltages, when the insulating layer 123 is smaller in thickness than the liquid crystal element 114 (for example, the thickness of the insulating layer 123 is approximately 3 μm, while the thickness of the liquid crystal element 114 is 5 μm). As shown in the graph, the phase differences in the gap regions are larger than the case shown in FIG. 22. More specifically, the aberration correcting unit of the present invention is improved to ensure sufficient phase differences even in the gap regions and enables the correction for aberration in these regions, which has not been possible in the prior art. It should be noted that the value of the phase difference required in each gap region depends on a variety of conditions and parameters such as a particular optical system, the type of disc, a control circuit, and so on for use therewith. Therefore, the thickness of the insulating layers may be determined to ensure desired phase differences in accordance with the conditions. In other words, the thickness of the insulating layers may be determined such that an electric field applied to a portion of the liquid crystal element corresponding to each gap region is equal to or larger than a predetermined intensity.

It should be noted that at least one of the insulating layers sandwiched between the liquid crystal element 114 and the electrode layers may be formed sufficiently thick, for example, thicker than the liquid crystal element, and both insulating layers sandwiching the liquid crystal element need not be formed thick.

As described above, sufficient phase changes can be provided even in the gap regions, thereby making it possible to accurately correct the influence of aberration occurring in an optical path.

While the foregoing embodiments have been described from a viewpoint of the correction for aberration of reflected light caused by the optical disc, the aberration correcting optical unit according to the present invention may be disposed at any position as long as it is on the optical path from the light source to the photodetector. Also, the aberration correcting optical unit according to the present invention is not limited for spherical aberration and coma aberration, but may be applied to a correction for a variety of aberrations such as astigmatism. Further, the present invention can be applied to an optical pickup apparatus which has a plurality of light sources or a plurality of optical paths. For example, the present invention can be applied to an optical pickup apparatus which includes light sources such as a two-wavelength laser or the like having different wavelengths for recording and reproducing CD and DVD, respectively.

According to the present invention, as described in detail, an electrode layer for applying voltages to the optical element (liquid crystal) is configured such that an appropriate electric field should be applied to a portion of the optical element corresponding to a portion between the plurality of electrodes (i.e., a gap) in order to correct aberration. In particular, the electrode layer is configured to have a multi-layer structure or an insulating layer of appropriate thickness is provided between the optical element and the electrode layer.

As is apparent from the foregoing, the present invention can provide high performance aberration correcting optical unit and an optical pickup apparatus capable of accurately correcting aberration occurring in an optical path.

The invention has been described with reference to the preferred embodiments thereof. It should be understood by those skilled in the art that a variety of alterations and modifications may be made from the embodiments described above. It is therefore contemplated that the appended claims encompass all such alternations and modifications.

What is claimed is:

1. An aberration correcting optical unit
   disposed in an optical path between a light source and an optical element for irradiating an information recording medium with a light beam emitted from said light source, in alignment with an optical axis, for correcting aberration of light caused by said information recording medium, comprising:

a liquid crystal element exhibiting a predetermined alignment state by applying a predetermined voltage; and mutually opposing electrodes for applying voltages to said liquid crystal element, said mutually opposing electrodes sandwiching said liquid wystal element, wherein at least one of said mutually opposing electrodes has a plurality of electrode layers, said plurality of electrode layers being stacked in the direction of said optical axis and each of said plurality of electrode layers having at least one segment electrode, and the segment electrodes of said plurality of electrode layers are arranged so as to correct said aberration of light when voltages are applied to the segment electrodes.

2. An aberration correcting optical unit according to claim 1, wherein the segment electrodes of said plurality of electrode layers are formed of shapes and arranged so as not to overlap one another in the direction of said optical axis.

3. An aberration correcting optical unit according to claim 1, wherein the segment electrodes of said plurality of electrode layers are arranged so as to partially overlap one another in the direction of said optical axis.

4. An aberration correcting optical unit according to claim 1, wherein said mutually opposing electrodes are applied with voltages which produce an electro-optical effect opposite to aberration characteristics caused by an information recording medium.

5. An optical pickup apparatus including the aberration correcting optical unit according to claim 4, comprising:

a photodetector for detecting a light beam reflected by said information recording medium and transmitted said aberration correcting optical unit.

6. An optical pickup apparatus according to claim 5, further comprising control means for applying said voltages across said mutually opposing electrodes of said aberration correcting optical unit.

7. An infonnation reproducing apparatus including the optical pickup apparatus according to claim 5, comprising:

control means for applying said voltages across said mutually opposing electrodes of said aberration correcting optical unit;

driving means for driving said light source to emit a light beam for reproduction of information; and reproducing means for reproducing information on the basis of an output of said photodetector.

8. An information recording apparatus including the optical pickup apparatus according to claim 4, comprising;

control means for applying said voltages across said mutually opposing electrodes of said aberration correcting optical unit; and driving means for driving said light source to emit a light beam for recording information.

* * * * *